United States Patent
Song

(10) Patent No.: US 11,250,083 B2
(45) Date of Patent: Feb. 15, 2022

(54) SYSTEMS AND METHODS FOR ENHANCED ONLINE RESEARCH

(71) Applicant: Seokkue Song, Wellesley, MA (US)

(72) Inventor: Seokkue Song, Wellesley, MA (US)

( * ) Notice: Subject to any disclaimer, the term of this patent is extended or adjusted under 35 U.S.C. 154(b) by 0 days.

(21) Appl. No.: 15/882,913

(22) Filed: Jan. 29, 2018

(65) Prior Publication Data

US 2018/0218084 A1  Aug. 2, 2018

Related U.S. Application Data

(60) Provisional application No. 62/452,040, filed on Jan. 30, 2017.

(51) Int. Cl.
| | |
|---|---|
| *G06F 16/35* | (2019.01) |
| *G06F 16/9535* | (2019.01) |
| *G06F 16/248* | (2019.01) |
| *G06F 16/2457* | (2019.01) |
| *H04L 29/08* | (2006.01) |

(52) U.S. Cl.
CPC ........ *G06F 16/9535* (2019.01); *G06F 16/248* (2019.01); *G06F 16/24578* (2019.01); *H04L 67/02* (2013.01); *H04L 67/306* (2013.01)

(58) Field of Classification Search
CPC .............. G06Q 50/01; G06Q 30/0242; G06Q 30/0201; G06Q 30/0241; G06F 16/24578; G06F 16/90324; G06F 16/9535; G06F 16/248; G06F 16/285; G06F 16/334; G06F 16/90335; G06F 16/904; G06F 16/9536; G06F 16/435; G06F 21/10; H04L 2463/101; H04L 63/101; G06N 5/02

USPC ............. 707/723, 728, 732–734, 736–738, 707/748–749, 751–752, 754, 708, 731, 707/771, E17.138, E17.111, E17.116, 707/E17.059, E17.067
See application file for complete search history.

(56) References Cited

U.S. PATENT DOCUMENTS

| | | | | |
|---|---|---|---|---|
| 7,454,166 B2* | 11/2008 | Patsiokas | ............... | H04H 40/90 455/186.1 |
| 7,536,323 B2* | 5/2009 | Hsieh | ..................... | G06Q 30/02 705/26.62 |
| 7,991,764 B2* | 8/2011 | Rathod | ............. | G06F 17/30867 707/713 |
| 8,463,658 B2* | 6/2013 | Racco | ................ | G06Q 30/0277 705/26.1 |
| 8,494,897 B1* | 7/2013 | Dawson | ................. | G06Q 30/02 705/14.42 |

(Continued)

OTHER PUBLICATIONS

PCT International Application No. PCT/US2018/015750, International Search Report dated Mar. 28, 2018, 9 pages.

*Primary Examiner* — Alex Gofman
*Assistant Examiner* — Linh Black
(74) *Attorney, Agent, or Firm* — DLA Piper LLP US

(57) ABSTRACT

Systems and methods for an enhanced online research are described. In exemplary embodiments, the enhanced research platform receives one or more keywords, and determines a research goal by parsing each of the keywords and identifying a category for each of the keywords. The enhanced research platform then queries a database to identify results matching the keywords based on analysis of the keywords and the research goal, and displays the identified results in a user interface.

18 Claims, 25 Drawing Sheets

(56) References Cited

U.S. PATENT DOCUMENTS

| | | | |
|---|---|---|---|
| 8,645,991 B2* | 2/2014 | McIntire | H04N 7/17318 |
| | | | 725/34 |
| 8,768,934 B2* | 7/2014 | Jones | G06F 17/30386 |
| | | | 707/748 |
| 8,935,272 B2* | 1/2015 | Ganti | G06F 16/219 |
| | | | 707/758 |
| 9,053,187 B2* | 6/2015 | Bennett | G06F 17/30675 |
| 9,201,979 B2* | 12/2015 | Ramer | G06F 17/30749 |
| 9,396,483 B2* | 7/2016 | Hamedi | H04L 67/02 |
| 9,507,865 B2* | 11/2016 | Nelson | G06F 17/3089 |
| 9,811,851 B2* | 11/2017 | Fox | G06Q 30/0631 |
| 10,096,033 B2* | 10/2018 | Heath | G06Q 30/02 |
| 2002/0091991 A1* | 7/2002 | Castro | G06F 9/06 |
| | | | 717/106 |
| 2005/0149538 A1 | 7/2005 | Singh et al. | |
| 2005/0160082 A1* | 7/2005 | Dawson | G06F 16/335 |
| 2008/0103781 A1* | 5/2008 | Wasson | G10L 15/22 |
| | | | 704/277 |
| 2012/0096389 A1* | 4/2012 | Flam | G06F 16/168 |
| 2012/0190386 A1* | 7/2012 | Anderson | G01S 19/14 |
| | | | 455/456.3 |
| 2013/0073387 A1* | 3/2013 | Heath | G06Q 50/01 |
| | | | 705/14.53 |
| 2013/0097148 A1 | 4/2013 | Kon et al. | |
| 2013/0275429 A1* | 10/2013 | York | G06F 16/435 |
| | | | 707/737 |
| 2014/0040275 A1 | 2/2014 | Dang et al. | |
| 2014/0172864 A1* | 6/2014 | Shum | G06F 19/00 |
| | | | 707/740 |
| 2015/0006492 A1* | 1/2015 | Wexler | G06F 16/248 |
| | | | 707/694 |
| 2015/0324434 A1* | 11/2015 | Greenwood | G06F 16/248 |
| | | | 707/722 |
| 2016/0054871 A1 | 2/2016 | Strike | |
| 2016/0149956 A1* | 5/2016 | Birnbaum | H04L 63/101 |
| | | | 726/1 |
| 2016/0323232 A1* | 11/2016 | Kristinsson | G06F 16/335 |
| 2018/0135122 A1* | 5/2018 | Hilden | G16B 20/00 |

* cited by examiner

FIG. 11C

SYSTEMS AND METHODS FOR ENHANCED ONLINE RESEARCH

CROSS-REFERENCE TO RELATED APPLICATION

This application claims priority to and the benefit of U.S. Provisional Patent Application 62/452,040 titled "Systems and methods for an enhanced search platform", filed on Jan. 30, 2017, the disclosure of which is incorporated herein by reference in its entirety.

FIELD

The present disclosure generally relates to online research.

BACKGROUND

Conventional search engines assume that users know what they are looking for, and that they know what keywords to use to get the information and know the best logical order of keywords. That is, if users enter the right query, then conventional search engines will provide the right answer. The quality of the search results is based on the accuracy of the keywords.

However, if the user does not have enough information on the subject, he or she may not be able to use accurate keywords to start the search. Therefore, the search results may include a large number of irrelevant contents which need to be checked individually by the user, which may lead to a waste of time. Therefore, there is a need for a better online research system and method whereas research is a consecutive action to search relevant information.

SUMMARY

In one aspect, the present disclosure relates to a method for an enhanced research platform. The method can comprise: receiving from a user, by a computer processor, one or more keywords; receiving from a user one or more tags; sending the one or more keywords and the one or more tags to a server; receiving from the server a plurality of curated online research archives, wherein each of the plurality of curated online research archives comprises a list of categorized websites matching the one or more keywords and the one or more tags; ranking the received plurality of curated online research archives based on a relevancy to the keywords and the tags; and displaying the ranked plurality of curated online research archives in a user interface.

In some embodiments, the method can comprise ranking the received plurality of curated online research archives based on an attribute of one of the plurality of curated online research archives, wherein the attribute comprises at least one of: real time trends and popularity, number of links, number of views, or rating.

In some embodiments, the method can comprise ranking the received plurality of curated online research archives based on an attribute of a creator associated with one of the plurality of curated online research archives, wherein the attribute comprises at least one of: number of subscribers of the creator, number of curated online research archives created by the creator, or rating of the creator.

In some embodiments, the method can comprise ranking the received plurality of curated online research archives based on an attribute of a website link associated with one of the plurality of curated online research archives, wherein the attribute comprises at least one of: duration of visit of the website link, number of characters on a webpage associated with the website link, or number of revisit associated with the website link.

In some embodiments, the method can comprise receiving user demographic and behavioral data; sending the received user demographic and behavioral data to the server; receiving a plurality of curated online research archives, wherein each of the plurality of curated online research archives comprises a list of categorized websites matching the one or more keywords, the one or more tags, the user demographic data, and the user behavioral data; and displaying the plurality of curated online research archives in the user interface. In some embodiments, the method can comprise ranking the plurality of curated online research archives based on relevancy to the keywords, the tags, the user demographic data, and the user behavioral data. In some embodiments, the user demographic data can comprise at least one of location of the user, gender, age, experience level, education level, or household income.

In some embodiments, each of the plurality of curated online research archives can comprise a title that indicates a research goal, an order of one or more sub-titles that indicate categories for grouping like websites, and an order of websites within each sub-title to indicate progression from an end-to-end research.

In another aspect, the present disclosure relates to a method for creating a curated online research archive, wherein the curated online research archive comprises a list of websites. In some embodiments, the method can comprise: receiving, by a computer processor, a title from a user; receiving one or more tags from the user; receiving one or more section names from the user; receiving instruction from a user to start recording search history; recording a list of websites visited by the user based on the received instruction; filtering the recorded list of websites; categorizing the filtered list of websites based on the one or more section names; creating a curated online research archive wherein the curated online research archive comprises the title, the one or more tags, and the categorized list of websites; and outputting the curated online research archive. In some embodiments, recording the list of websites visited by the user can comprise recording the list of websites with a browser extension.

In some embodiments, filtering the recorded list of websites can comprise: displaying the recorded list of websites to the user; receiving from the user a selection of one or more websites; and removing the one or more websites from the recorded list of websites based on the received selection. In some embodiments, filtering the recorded list of websites can comprise filtering the recorded list of websites based on a set of pre-defined rules.

In some embodiments, the method can comprise: receiving user demographic data; updating the curated online research archive by adding the received user demographic data to the curated online research archive; and outputting the updated curated online research archive. In some embodiments, the user demographic data comprises at least one of location of the user, gender, age, experience level, education level, or household income.

In some embodiments, the method can comprise: receiving an instruction of editing from the user; and updating the categorized list of websites in response to the instruction of editing.

In another aspect, the present disclosure relates to a system for an enhanced research platform, the system comprising: a computer processor; and a non-transitory computer readable storage medium storing computer program instructions, the instructions when executed by the computer processor causing the computer processor to perform steps comprising: receiving from a user one or more keywords; receiving from a user one or more tags; sending the one or more keywords and the one or more tags to a server; receiving from the server a plurality of curated online research archives, wherein each of the plurality of curated online research archives comprises a list of categorized websites matching the one or more keywords and the one or more tags; ranking the received plurality of curated online research archives based on a relevancy to the keywords and the tags; and displaying the ranked plurality of curated online research archives in a user interface.

BRIEF DESCRIPTION OF THE DRAWINGS

To assist those of skill in the art in making and using an enhanced research system and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting. In the figures:

FIGS. 11A-11F illustrate exemplary user interfaces for the enhanced research system, according to an example embodiment.

DETAILED DESCRIPTION

Figure 1:
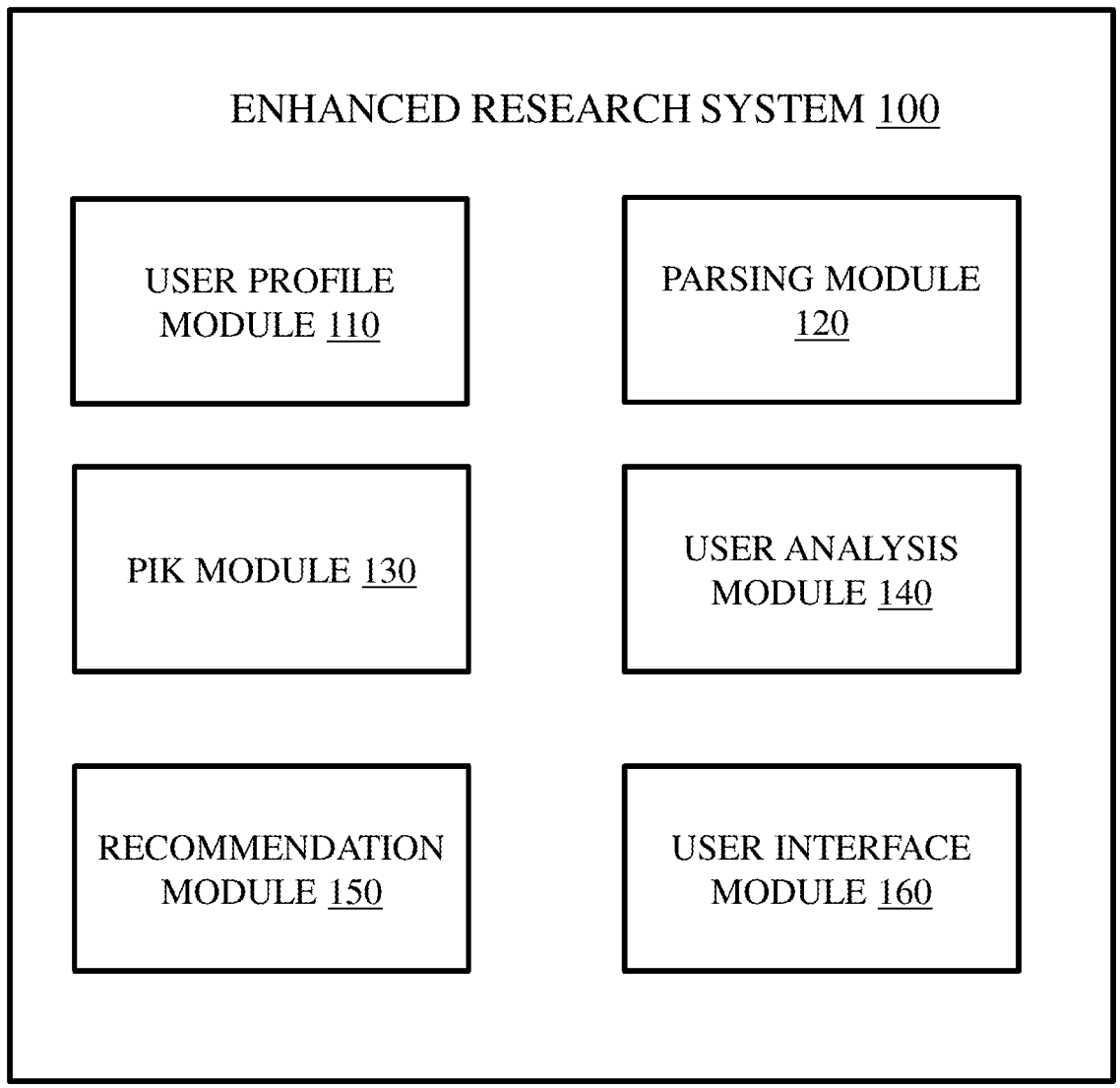
FIG. 1 is a block diagram showing an enhanced research system implemented in modules, according to some embodiments of the present disclosure.

A user who needs to find information for their complex online research typically find information through a multitude of venues, ranging from search engines, forums and community boards, and social media and chat. One of the most common solutions is utilize search engines to receive quick answers or links to websites containing the information. The user may type keywords related to his or her research goal. The search results are then populated with links chosen by its algorithm. The user may then, based on personal experiences, selectively choose one or more links to browse and continue doing so. During the browsing process, the user may decide enough information has been gathered. The user may also start a new search with new keywords, or give up the process due to a lack of relevant search results.

Conventional search engines assume that users know what they are looking for, and that they know what keywords to use to get the information and know the best logical order of keywords. That is, if users enter the right query, then conventional search engines will provide the right answer. However, a user's initial or perceptual needs can be different from actual needs. There is a difference in what users think they want versus what they actually need. Users may also struggle to find the right keywords to obtain the right information. Some topics may require basic research just to understand relevant jargon. Users may follow an illogical order of keywords, lengthening their search time.

There are several areas for improvement in this process. First, the user needs to know the appropriate keywords to search to find the best results. A novice may not know the jargon necessary to produce the search results he/she needs in the beginning. He or she may not know what's the best keywords to search first, second, third, etc. Without the correct order, the knowledge obtained may be confusing. Second, as the basics of the algorithm is known to marketers, they have used that to their advantage. By manipulating the metadata, the title, and content, the website can be high on the search result list without being the most useful for the user's research. This leads to the third issue of bouncing, when users click on non-essential links, leave, and ultimately, waste their time. Finally, there is the issue of accurate and comprehensive knowledge. It is difficult for beginners to know that their research is complete without knowing all the components of the topic beforehand and that the information they are reading is accurate. Their "feeling" of what is correct and complete may lead to poor decisions in the future. Therefore, a better online research system and method is needed for users with limited information of the subject.

Knowledgeable users may also encounter difficulties with the traditional search method. A user can save his or her research in order to refer or update to it later, and share or collaborate with others, for personal and professional reasons. Typical solutions for such this situation may be keeping tabs of useful sites open, creating spreadsheets and copying and pasting the information into them, or bookmarking relevant sites. However, there are plenty of possibilities of failure. For example, the browser may crash and the session was not saved. The user may also only save the link, but not relevant information to help reference them later. Therefore, there is also a need for a better online research system and method for users with substantial information of the subject.

The present disclosure describes a system and method of enhance online research. In some embodiments, a beginner may not need to know what exactly to search as long as he or she has a question or topic in mind. The user will be able to view curated online research archives (referred herein as "Piks") from other creators or via a proprietary algorithm. In some embodiments, curated online research archives can also be referred as "search journeys", as described in U.S. Provisional Application 62/452,040 titled "System and methods for an enhanced research platform," filed on Jan. 30, 2017, the disclosure of which is incorporated herein by reference in its entirety. The curated online research archives (or "Piks") will consist of a comprehensive view of all the sub-topics with links and comments. Since these links have been chosen based on its usefulness, the chance of bouncing is greatly decreased. The user can see the ratings and descriptions of the creator and their Piks to validate the accuracy and usefulness of the research.

For a knowledgeable user (referred herein as a "creator"), the described system and method can offer two methods to help organize, save, and share their research. First, creators will be able to copy and paste their links and relevant information to their account. Doing so allows them to access the research as long as they have a device able to interact with the internet. Secondly, a browser extension will help automatically save essential links and information with areas for the user to place comments and further organize.

Research Goal-Based Online Research

Described in detail herein is a search system that analyzes user behavior with user modeling and cognitive technology, supports a research goal, and recommends other users' search history or journey who had the same or similar research goal.

In exemplary embodiments, the enhanced research system supports a research goal. In an example embodiment, the enhanced research system parses keywords or search terms entered by a user, and automatically determines the research goal through keyword analysis. The enhanced research system may assign a category to each keyword or search term entered by the user.

In some embodiments, the enhanced research system also enables creation of a Pik. As used herein, a "Pik" can be an organized list of search results or content available on the Internet that a user found valuable or relevant to his or her research goal. A Pik may include a title that indicates a research goal, a sub-title that indicates categories for grouping like data, content, websites and information, and an order of websites and content within each sub-title to indicate progression from a broad concept to a narrow concept. A Pik may be a streamlined report of search activity from start to finish. For example, a user may be interested in buying a drone, and he or she may be a diligent person who likes to perform in-depth research prior to buying a drone. So the user enters 30 or so keywords in the search box and visits approximately 200 links or search results spending a total of about 5 hours searching. Via the enhanced research system, the user can save the relevant or valuable links or search results visited as a Pik. The user can also categorize the saved links and set a logical order for the links in the Pik.

In one embodiment, a user can create his or her own Pik. In other embodiments, the enhanced research system automatically creates a Pik by analyzing data collected over time, where the data indicates the relevancy of a search result or content to a user's research goal. A Pik may include a category title for content or search results, and an order of content or search results (which may be based on relevancy). In some embodiments, the system can provide suggestions to a user. For example, when a user creates a title for a research goal, the system can suggest sections to consider. In some embodiments, when a user refers to or edits a Pik, the system can suggest new links to add into one or more sections of the Pik.

In some embodiments, the enhanced research system can analyze user behavior to provide search results and content that is relevant to the user. The user behavior may be characterized using machine learning techniques, cognitive technology, user behavior modeling, search history, browsing history, purchase history, and other data that can aid in characterizing a user.

The enhanced research system can also recommend another user's Pik. In an example embodiment, the enhanced research system analyzes the user characterization and the user's research goal, and identifies existing Piks that match or substantially match the user characterization and the user's research goal.

In an example embodiment, the enhanced research system is provided as a plug-in or extension for use with an installed web browser on a computing device. For use on a mobile device, the enhanced research system may be provided as an application (e.g., app).

In some embodiments, the user can share his or her Pik with other users of the enhanced research system. The user may also edit his or her own Pik. The enhanced research system may also include a messaging system, where the user can send messages to other users. In this manner, the enhanced research system provides a collaborative environment for users to find, learn and share knowledge and information. In some embodiments, the sharing of Pik can include a collaborative or social research. For example, a user (knowledgeable or not) can start a Pik and have it open to the public to add sections and links. In some embodiments, a user can invite people (friends, family, etc.) to collaborate on a Pik. For example, a user may plan for a group trip and start a Pik of travel research. The user can invite other people who would travel with him or her to collaborate on the Pik.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

FIG. 1 is a block diagram showing an enhanced research system 100 implemented in modules, according to an example embodiment. In some embodiments, the system can be implemented in server 830 shown in FIG. 8, and a client device can access to the system via the Internet. In some embodiments, the system may be implemented in devices 810, 820 shown in FIG. 8. The modules include a user profile module 110, a parsing module 120, a Pik module 130, a user analysis module 140, a recommendation module 150, and a user interface module 160. The modules may include various circuits and one or more software components, programs, applications, apps or other units of code base or instructions configured to be executed by one or more processors included in devices 810, 820. In other embodiments, one or more of user profile module 110, parsing module 120, Pik module 130, user analysis module 140, recommendation module 150, user interface module 160 may be included in server 830, while others can be provided in the device 810, 820. Although user profile module 110, parsing module 120, Pik module 130, user analysis module 140, recommendation module 150 and user interface module 160 are shown as distinct modules in FIG. 1, it should be understood that they may be implemented as fewer or more modules than illustrated. It should be understood that any of modules may communicate with one or more components included in system 800 (FIG. 8), such as database(s) (e.g., database(s) 840), server (e.g., server 830), or devices (e.g., devices 810, 820).

The user profile module 110 may be a software or hardware-implemented module that may be configured to manage and maintain user profiles for users of the enhanced research system. The user profiles may include information such as username, password, name, geographic location, demographics, user preferences, and other user information.

The parsing module 120 may be a software or hardware-implemented module that may be configured to identify a research goal by parsing one or more keywords or search terms entered by a user in the enhanced research system. The parsing module 120 may categorize each of the keywords or search terms entered by the user into, for example, target, action, purpose, experience level, price range, and others. The parsing module 120 may use natural language processing, clustering techniques, auto labeling techniques, and other mechanisms to categorize the keywords or search terms. In an example embodiment, the parsing module 120 may recognize a pattern based on a user's past search history or past entered-keywords, and use the pattern to categorize the instant keywords or search terms entered by a user. The categorized keywords or search terms may be referred to as the research goal.

For example, a user may enter the following as keywords or search terms: "I want to buy a drone for school project." The parsing module 120 may parse the keywords, and categorize them. For example, "drone" may be categorized as 'target,' "buy" may be categorized as 'action,' "school" may be categorized as 'purpose.' In an example embodiment, the parsing module 120 may identify an experience level for the research goal based on past search history. For example, the experience level may be set as "beginner" based on the parsing module 120 recognizing from past search history and user activity that the user has beginner level knowledge of drones.

In an example embodiment, the user may characterize the keywords or search terms by entering them in the user interface under specific categories.

The Pik module 130 may be a software or hardware-implemented module that may be configured to store created Piks in a database, manage and maintain Piks, update Piks based on edits made by users, and record sharing of Piks by users with other users. The Pik module 130 may manage data and information for each Pik, for example, an organized list of links, search results, or content.

In an example embodiment, the Pik module 130 may be configured to automatically generate a Pik by analyzing relevancy of search results with respect to a research goal. The Pik module 130 may employ machine learning techniques to analyze large amounts of data, including a number of users who visit particular links or content in view of the keywords searched, an amount of time spent by users on a particular website in view of the keywords searched, and any subsequent actions taken by the user with respect to the website (e.g., saving as bookmark, clicking on another link within the website, completing a purchase on the website, etc.). In some embodiments, the Pik module 130 can employ machine learning techniques to analyze other data and metrics.

The user analysis module 140 may be a software or hardware-implemented module that may be configured to characterize users by analyzing various data related to users, and storing the determined characteristics in a database. For example, the user analysis module 140 may analyze data such as a user's search history, user's browsing history, user's purchase habits, user's demographics, user's geographic location, user's social media profile and content, and the like. The user analysis module 140 may employ machine learning techniques or cognitive technology to analyze data and characterize users. In some embodiments, the user analysis module 140 can be implemented in a server which can be accessed by different user with difference user devices. In some embodiments, the user analysis module 140 can be implemented in one user device which is shared by difference users who may have separate profile and/or account on the user device.

The recommendation module 150 may be a software or hardware-implemented module that may be configured to query a database to generate Pik search results and rank Pik search results based on analyzing the relevancy of each results in view of the research goal identified by the parsing module 120 and the user characteristics identified by the user analysis module 140. The recommendation module 150 may also be configured to query a database to identify Piks that match or substantially match the research goal and the user characteristics. The recommendation module 150 may employ mathematical algorithms or techniques that implement user modeling, collaborative filtering, content based filtering, regression modeling, and other mechanisms to provide personalized search results and personalized recommendation of Piks. The recommendation module 150 may also analyze information such as popularity of the Pik, timeliness, and other factors when determining if a Pik should be recommended to the user.

The recommendation module 150 identifies search results and Piks based searching of the keywords and each keyword's assigned category. To illustrate using the previous example of "I want to buy a drone for school project", the recommendation module 150, while searching the Internet or querying a database, takes into consideration that "drone" is the target, "buy" is the action, "school" is the purpose, and "beginner" is the experience level. In this manner, the enhanced research system is able to provide more relevant results than conventional search engines.

In an example embodiment, each Pik is associated with one or more research goal and stored as such in the database. Each Pik may also be associated with user characteristics based on the user who created the Pik. In an example embodiment, the recommendation module 150 ranks the Piks based on how well each matches the research goal and/or the user characteristics. For example, Piks associated with the same research goal as the keywords entered by the user and associated with the same user characteristics as the instant user are ranked higher. The Piks may also be ranked based on other factors including creation time, research trends or popularity.

The user interface module 160 may be a software or hardware-implemented module that may be configured to manage and display a user interface on device 710, 720 that enables a user to use the enhanced research system described herein. The user interface module 160 may facilitate display of the search results and Piks identified by the enhanced research system. Exemplary user interface screens are described with respect to FIGS. 6A-6F.

Figure 2:
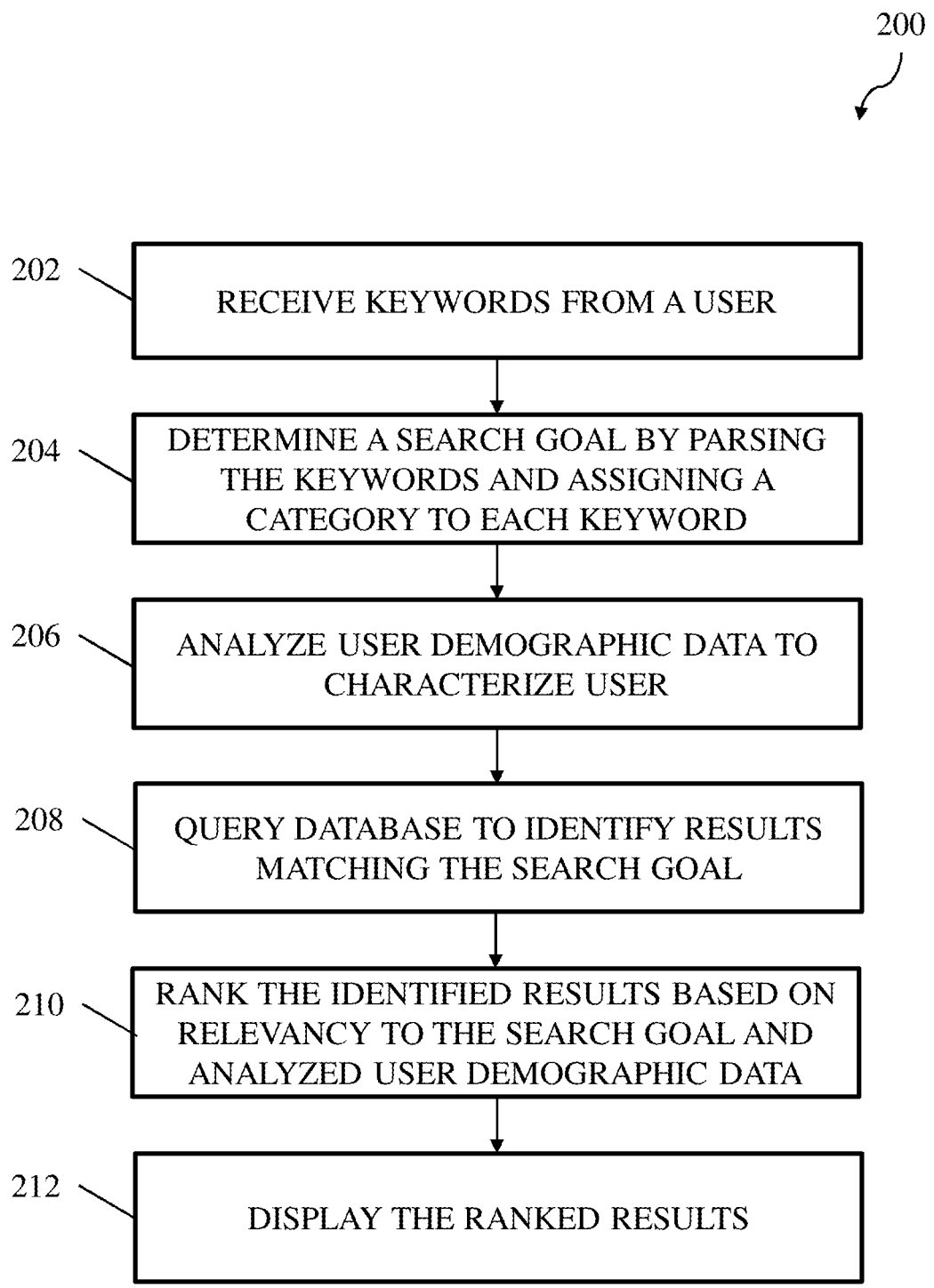
FIG. 2 is a flowchart of an exemplary research goal-based method performed by the enhanced research system, according to some embodiments of the present disclosure.

FIG. 2 is a flowchart of an exemplary method 200 performed by the enhanced research system in an example embodiment. At step 202, the parsing module 120 receives keywords from a user via user interface screen provided by the enhanced research system. At step 204, the parsing module 120 determines a research goal by categorizing the keywords entered by the user. The parsing module 120 may categorize each of the keywords or search terms entered by the user into categories, such as target, action, purpose, experience level, price range, and others. The parsing module 120 may use natural language processing, clustering techniques, auto labeling techniques, and other mechanisms to categorize the keywords or search terms. In an example embodiment, the parsing module 120 may recognize a pattern based on a user's past search history or past entered-keywords, and use the pattern to categorize the instant keywords or search terms entered by a user.

At step 206, the user analysis module 140 analyzes user demographic and behavioral data to characterize the user. For example, the user analysis module 140 may analyze demographic data such as location of the user, gender, age, experience level, education level, household income, and the like. The user analysis module 140 may also analyze data such as a user's search history, user's browsing history, user's purchase habits, user's social media profile and content, and the like. The user analysis module 140 may employ machine learning techniques or cognitive technology to analyze data and characterize users.

At step 208, the recommendation module 150 queries the database to identify results that match or substantially match the research goal. In an example embodiment, the identified results are Piks. In an example embodiment, the recommendation module 150 also identifies results based on analysis of the user demographic and behavioral data.

At step 210, the recommendation module 150 ranks the identified results based each results relevancy to the research goal. The results are also ranked based on analysis of user demographic and behavioral data and determination of relevancy of the results based on the demographic and behavioral data. At step 212, the user interface module 160 displays the ranked results in a user interface (for example, user interface screen 640, FIG. 6E, described below). In some embodiments, the recommendation module 150 can also sort the Pik results by date, most viewed, most saved, rankings, or number of links. In some embodiments, the recommendation module 150 can also filter the Pik results by categories.

Keywords and Tags-Based Online Research

In some embodiments, a user can provide one or more keywords and tags, instead of research goals. The system can then return one or more Piks to the user based on the identified keywords and tags.

Figure 3:
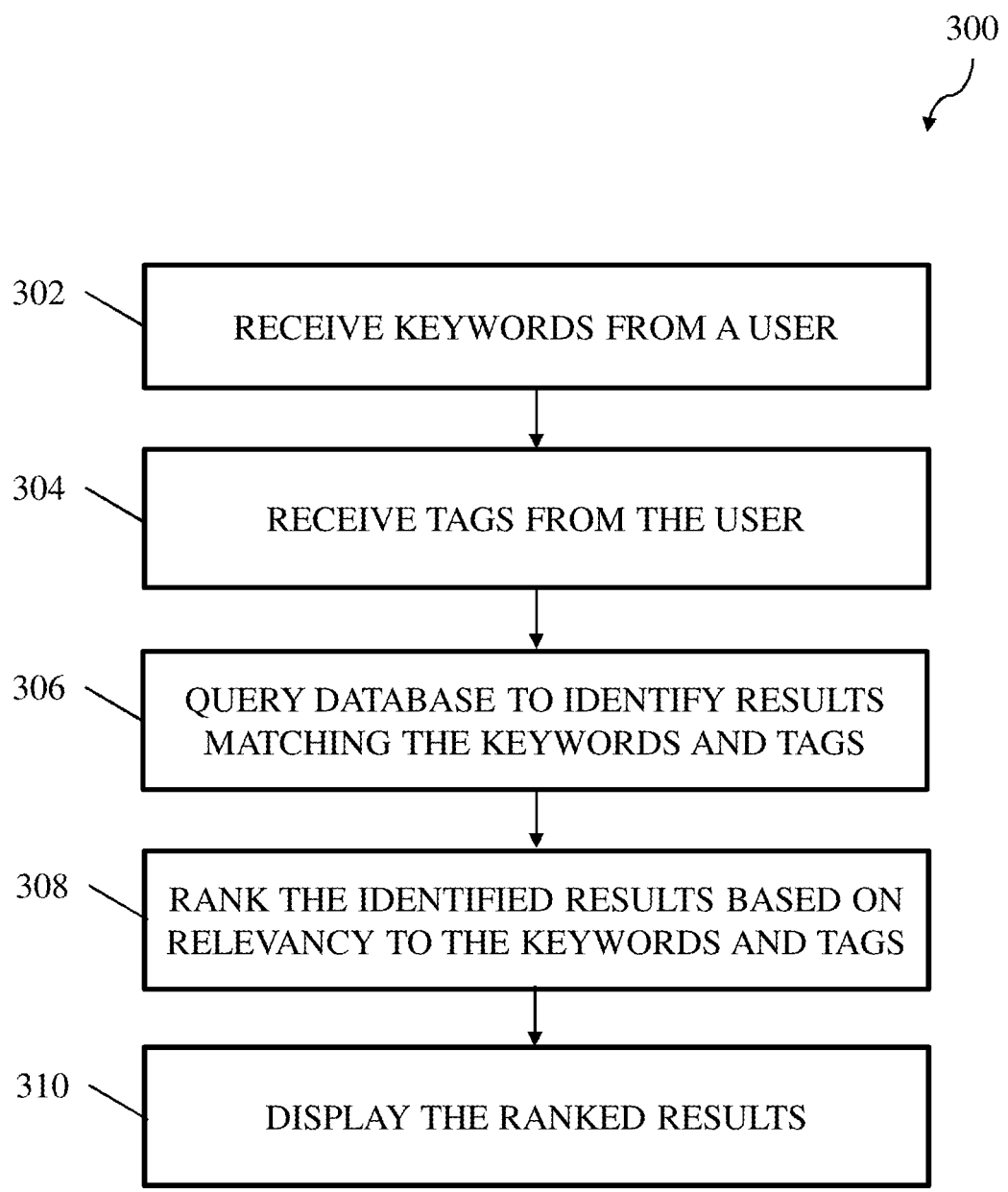
FIG. 3 is a flowchart of an exemplary keywords-based method performed by the enhanced research system, according to some embodiments of the present disclosure.

FIG. 3 is a flow chart showing a keywords and tags-based online research method 300. At step 302, the system can receive one or more keywords from the user. For example, in one embodiment, the keywords can include a name of a type of product that the user is interested in. In one embodiment, the keywords can include a name of a travel destination for a trip that the user is planning for. In one embodiment, the keywords can include a service that the user may need.

At step 304, the system can receive one or more tags from the user. In some embodiments, a user can type in keywords and then receive the list of Pik results with relevant tags at the top. At the Pik search result page, there will be a list of relevant tags, that the user can choose to help filter out their result pages. For example, in one embodiment, the tags can include a price range for the product that the user is interested in. In one embodiment, the tags can include a time for the trip that the user is planning for. In one embodiment, the tags can include the user's demographic data such as location of the user, gender, age, experience level, education level, household income, and the like.

At step 306, the system can query the database to identify results that match or substantially match the keywords and tags. In one embodiment, the identified results are one or more Piks. In one embodiment, the system also identifies results based on analysis of the user demographic and behavioral data.

At step 308, the system can rank the identified results based each results relevancy to the keywords and the tags. The results are also ranked based on analysis of user demographic and behavioral data and determination of relevancy of the results based on the demographic and behavioral data. At step 310, the user interface module 160 displays the ranked results in a user interface.

Figure 4A:
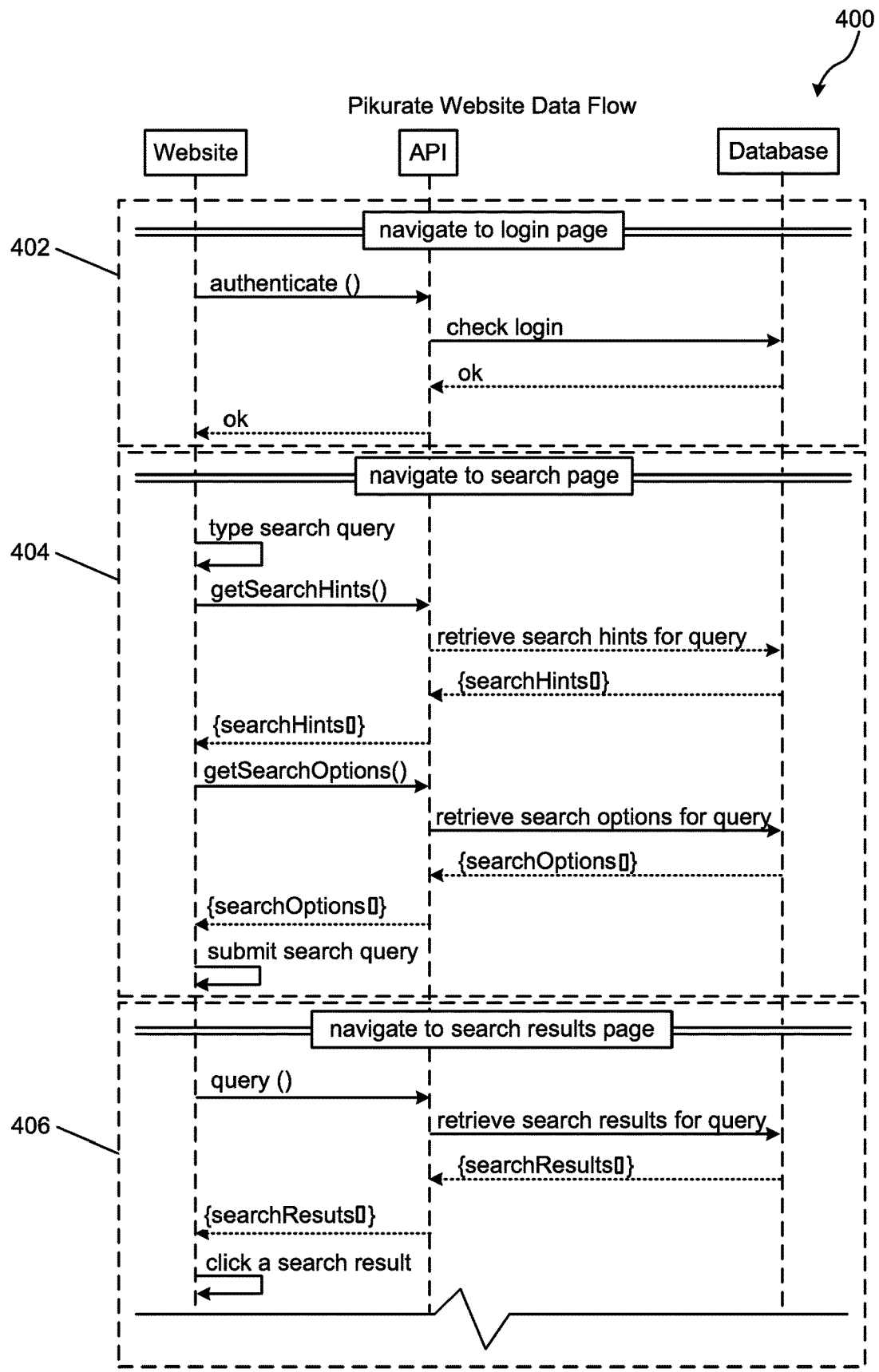
FIGS. 4A and 4B are flowcharts illustrating an exemplary data flow for the enhanced research system, according to some embodiments of the present disclosure.
Figure 4B:
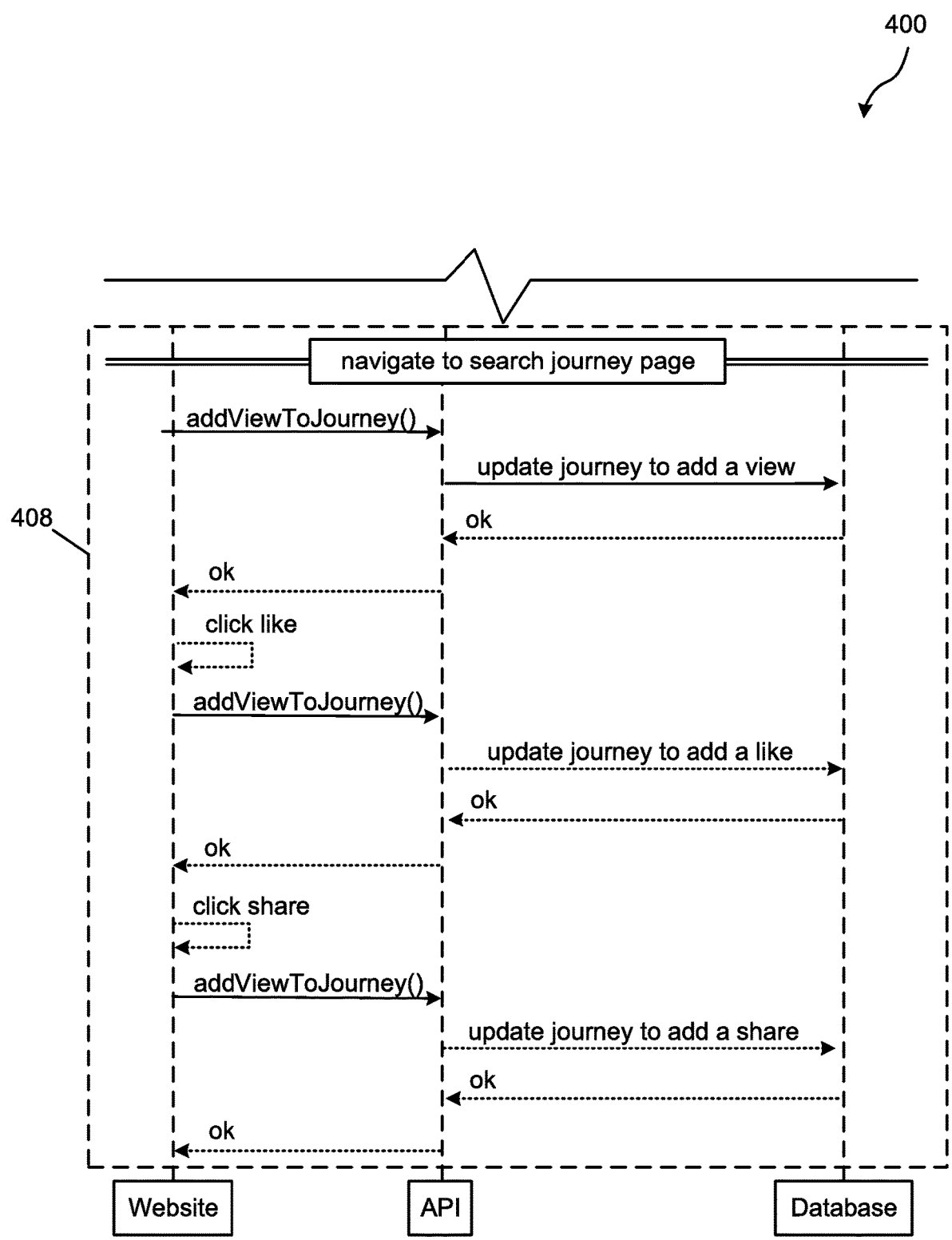

FIGS. 4A and 4B are flowcharts 400 illustrating an exemplary data flow for the enhanced research system, according to an example embodiment. In this example, the enhanced research system is provided as a website. The flowcharts 400 illustrate data flow between various components, such as the enhanced research system (e.g., website), the API for the enhanced research system, and the database. The flowcharts 400 illustrate the data flow when a user navigates to a login page for the enhanced research system, when a user navigates to a search dialog box/page, when a user navigates to the search results page generated by the enhanced research system, and when a user navigates to a Pik page.

At step 402, the user can enter his or her credentials associated with the enhanced research system on the enhanced research system website and the application interface (API) can send the login information to the database. If the authentication is finished, the user can be navigated to a search page at step 404. The user can type search keywords on the website. The user can get search hints from the database through the website and the API. The user can also get search options from the database through the website and the API. The user can then submit the search query on the website. At step 406, the user can be navigated to a search results page. The website can request and display search results from the database. The search results can include one or more Piks created by other users. At step 408, the user can choose to view a specific Pik from the search results. Then the website can send this selection to the database to update the number of views for this Pik. The user can also click a "like" button and accordingly the number of likes for this Pik can be updated. The user can also share this Pik with others via social networks or other channels (e.g., email, texts, etc.) Then the number of shares for this Pik can also be updated. In some embodiments, the user can provide a rating for the Pik and the average rating of the Pik can be updated. In some embodiments, the user can save Piks onto his or her account. In some embodiments, the user can subscribe to a specific creator.

Creation of a Pik

The present disclosure describes a system and method for a user to create and save his or her Piks. In some embodiments, the user can create and save a Pik using a website. In some embodiments, the user can create and save a Pik using a browser extension (e.g., a Google Chrome™ extension.)

Figure 5:
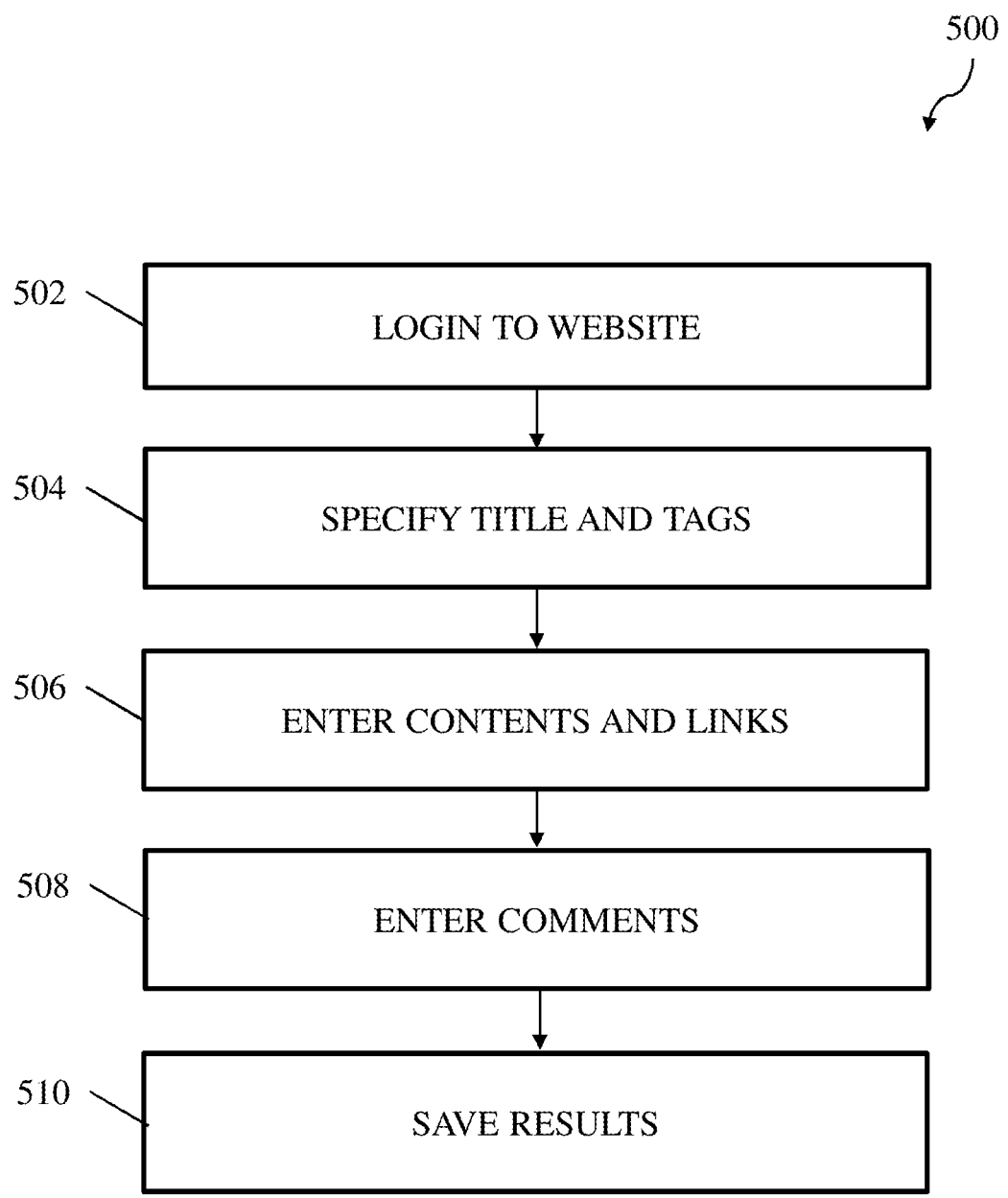
FIG. 5 is a flowchart of website-based curated online research archive (or "Pik") creation method performed by the enhanced research system, according to some embodiments of the present disclosure.

FIG. 5 is a flowchart showing a website-based method 500 of creating a Pik. At step 502, the user can login to the system's website (e.g., "Pikurate" website) with his or her credentials. At step 504, the user can specify a title and one or more tags for the Pik. At step 506, the user can enter contents and links of the Pik on the website. In some embodiments, the user can copy website links which he or she is visiting and paste them on the system's website. In some embodiments, the user can copy website contents which he or she likes and paste them on the system's website, and the website contents can be tied to the links that are saved. At step 508, the user can add comments on the system's website. In some embodiments, the user can add notes about the website links. In some embodiments, the user can explain why he or she likes the contents. At step 510, the use can save the created Pik in the system.

Figure 6:
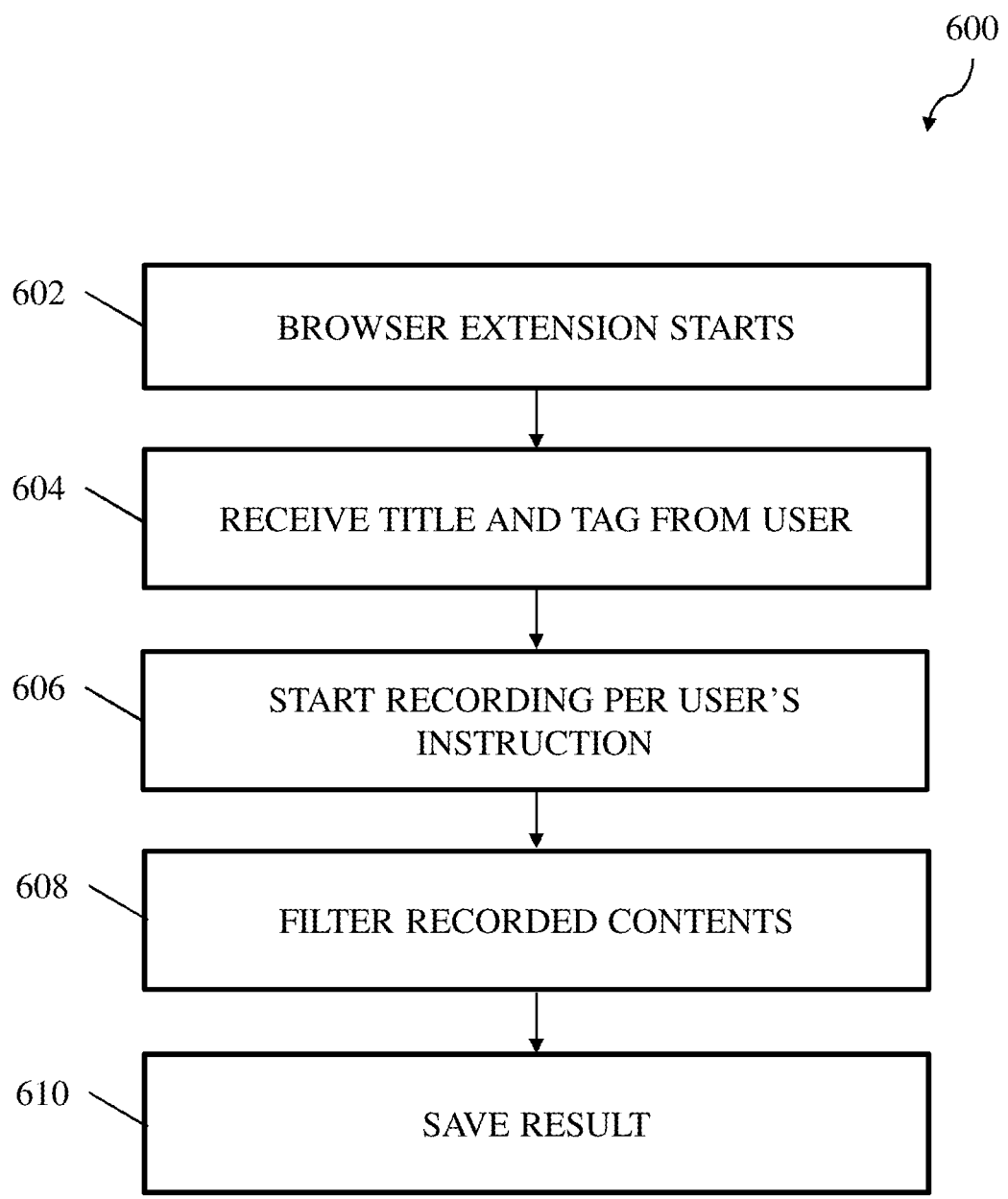
FIG. 6 is a flowchart of browser extension-based Pik creation method performed by the enhanced research system, according to some embodiments of the present disclosure.

FIG. 6 is a flowchart showing a browser extension-based method 600 of creating a Pik. At step 602, the browser extension can (e.g., Google Chrome™ extension, Firefox® extension, etc.) start automatically when the user opens an Internet browser (e.g., Google Chrome™ browser, Firefox® browser, etc.) In some embodiment, the user can manually enable the browser extension in the browser.

At step 604, the browser extension can receive a title and one or more tags from the user. For example, in one embodiment, the title can include a name of a type of product that the user is interested in. In one embodiment, the title can include a name of a travel destination for a trip that the user is planning for. In one embodiment, the title can include a service that the user may need. In one embodiment, the tags can include a price range for the product that the user is interested in. In one embodiment, the tags can include a time for the trip that the user is planning for. In one embodiment, the tags can include the user's demographic and behavioral data such as location of the user, gender, age, experience level, education level, household income, and the like.

At step 606, the browser extension can receive the user's instruction to start to record the user's browsing history. In some embodiments, the user can click a button on the browser extension to start the recording. In some embodiments, the user can click the button to end the recording. In some embodiments, the user can also manually save links & comment with extension buttons or hotkeys.

At step 608, the recorded browsing history can be filtered. In some embodiments, the user can manually remove any website links that are not needed. In some embodiment, the browser extension can filter the list with a pre-defined algorithm. In one embodiment, the algorithm can filter the list based on how long the user stays on a specific website. In another embodiment, the algorithm can filter based on actions taken on a specific website, such as clicks, scrolls, etc. In another embodiment, the algorithm can filter based on the minimum amount of characters on a specific website. In another embodiment, the algorithm can filter based on keyword analysis. In another embodiment, the algorithm can filter based on links saved by other users.

At step 610, the user can save the created Pik in the browser extension. In some embodiments, if the user wants to share the created Pik, the browser extension can upload it to a system server.

Figure 7A:
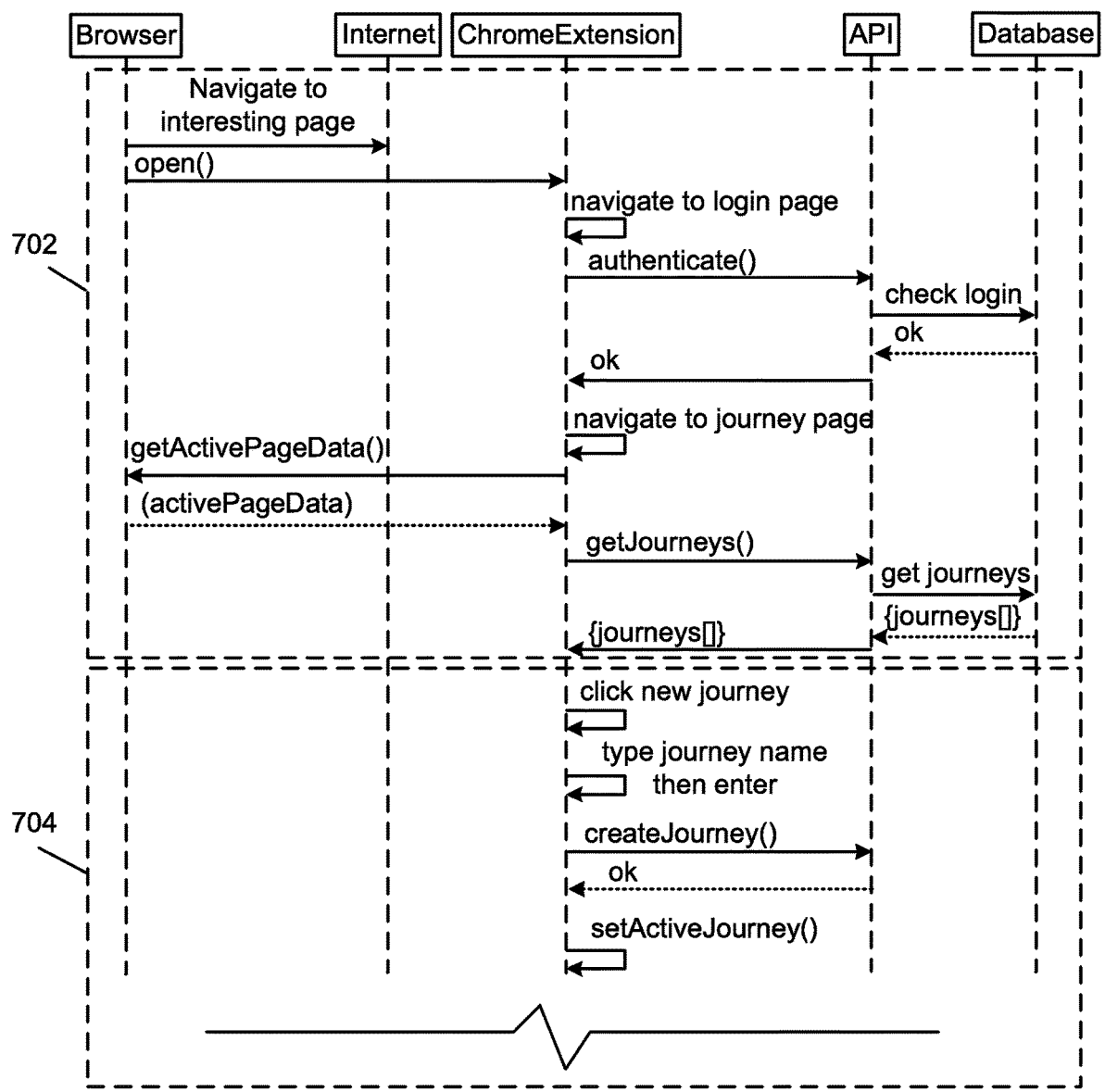
FIGS. 7A and 7B are flowcharts illustrating an exemplary data flow for the enhanced research system, according to some embodiments of the present disclosure.
Figure 7B:
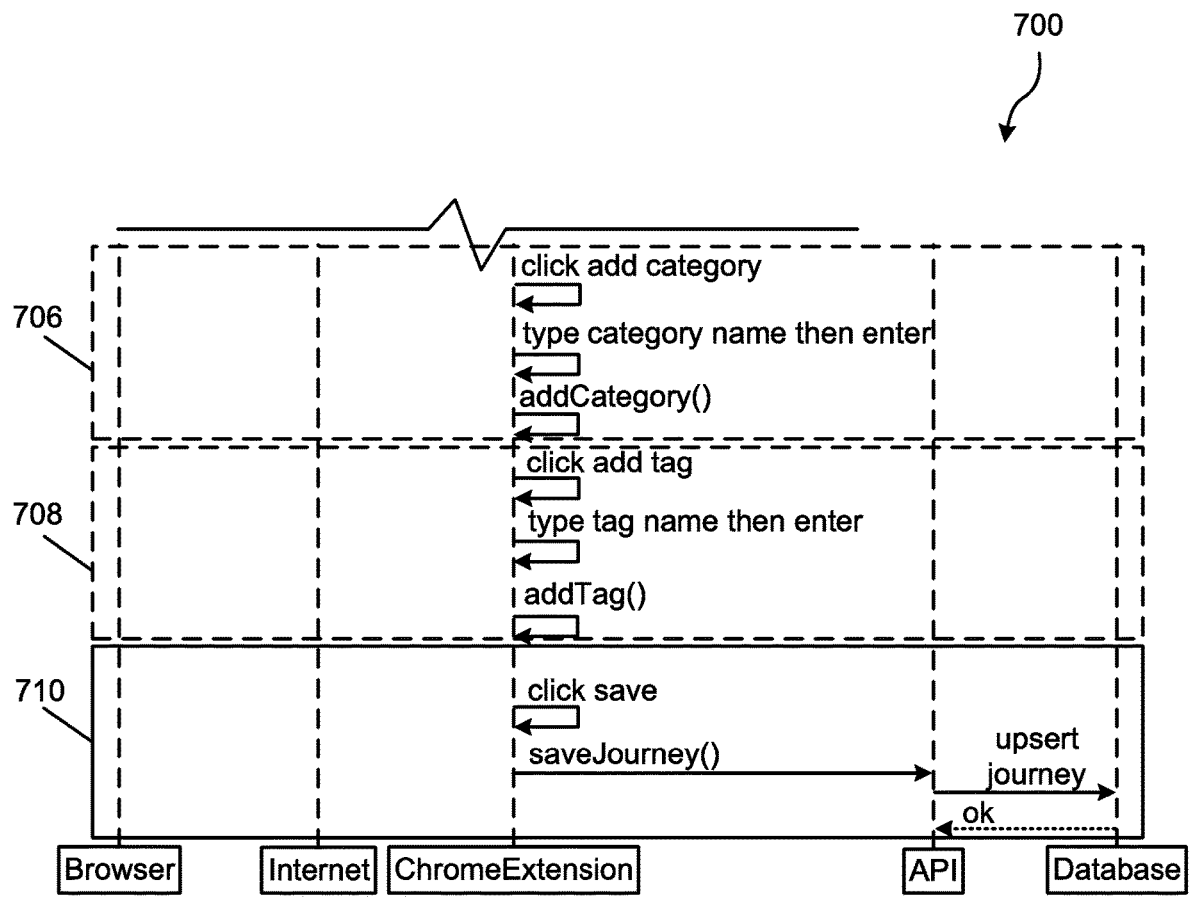

FIGS. 7A and 7B are flowcharts 700 illustrating an exemplary data flow for the enhanced research system according to an example embodiment. The Pik is referred to search journey in FIGS. 7A-7B. In this example, the enhanced research system is provided as Google Chrome™ Extension. The flowcharts 700 illustrate data flow between various components, such as a user's web browser, Internet, the enhanced research system (e.g., Google Chrome™ Extension), the API for the enhanced research system, and the database. The flowcharts 700 illustrate the data flow when a user creates a Pik.

At step 702, the user can start a browser (e.g., Google Chrome™ browser, Firefox® browser) to search information on the Internet. The enhanced research system can include an extension tool in the browser (e.g., Google Chrome™ extensions in Google Chrome™ browser.) The extension tool can be activated as the browser runs. The extension tool can navigate the user to a login page where the user enters his or her credentials with the enhanced research system. Then the extension tool can send the credentials to the database for authentication. If the login information passes authentication process, the use can be navigated to a Pik page. The extension tool can get the current active page data and analyze. It can record the browsing history and send the data to the database. At step 704, the user can start to record a new Pik by clicking a button on the extension tool. The user can be asked to enter a name for the new Pik. The created new Pik can be set to the active journey. At step 706, the user can be asked to add a category name for the new Pik. At step 708, the user can be asked to add a tag name for the new Pik. At step 710, the user can choose to save the current Pik and the extension tool can send the data to the database.

In some embodiments, the enhanced research system can include a filter to remove unwanted or irrelevant search history. In one embodiment, a manual filter can be implemented so that the user can manually select which search history and/or record to keep and remove the rest. In one embodiment, an automatic filter can be implemented with pre-defined algorithm and/or rules. For example, the filter can automatically remove parent webpages and only keep relevant child-webpages. In another example, the filter can automatically detect if the user scrolls down the webpage being visited. If so, the filter can determine the webpage is relevant and keep it in the search record. These relevant webpages are saved into the active section. The user can also manually save the links, comment on them, or highlight and save sections via extension buttons or hotkeys. The user can access, edit, organize, and update them later through the extension or a website of the system. In some embodiments, the system can filter the search history with other criteria including duration of visit by the user, whether it is a search engine results page, mouse action, number of characters on the website, etc.

Figure 8:
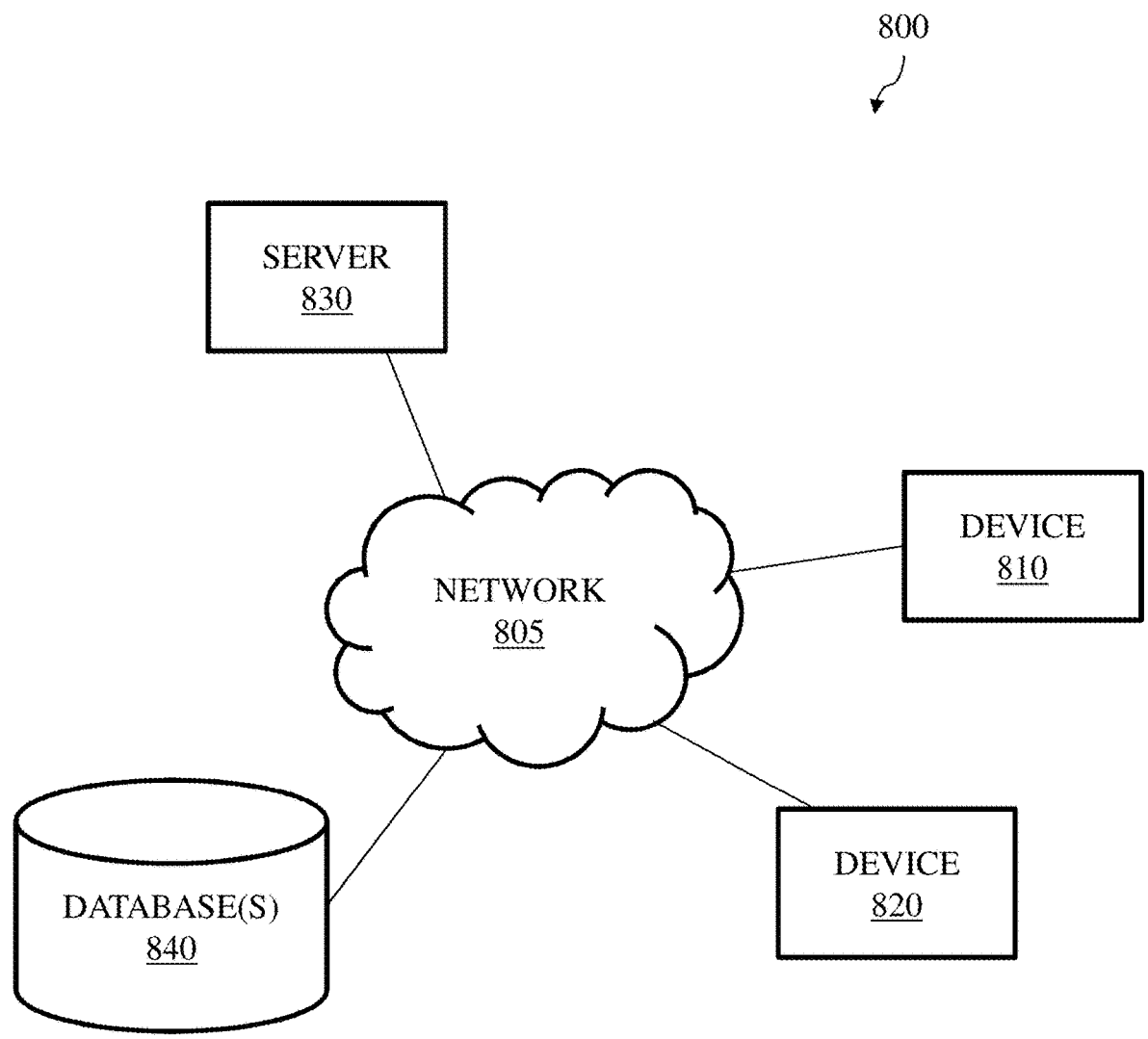
FIG. 8 is a network diagram depicting a system for implementing the enhanced research system, according to some embodiments of the present disclosure.
Figure 9:
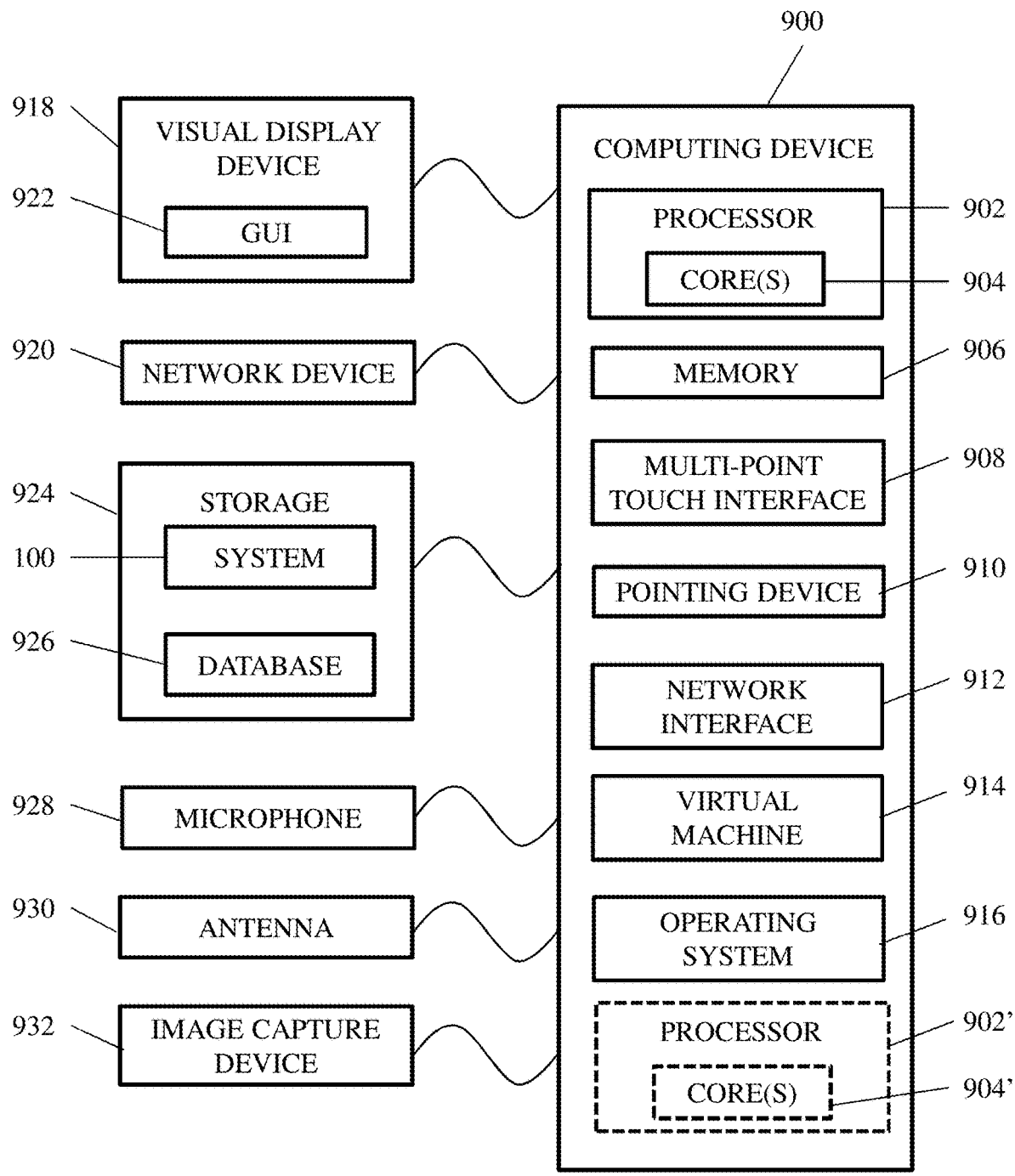
FIG. 9 is a block diagram of an exemplary computing device that may be used to implement exemplary embodiments of the enhanced research system described herein.

FIG. 8 illustrates a network diagram depicting a system 800 for implementing the enhanced research system, according to an example embodiment. The system 800 can include a network 805, multiple devices, for example, device 810, device 820, a server 830, and database(s) 840. Each of the devices 810, 820, servers 830, and database(s) 840 is in communication with the network 805. In some embodiments, device 810, device 820, server 830, database(s) 840 can include one or more computer devices 900 as shown in FIG. 9.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMax network, any other type of network, or a combination of two or more such networks.

The devices 810, 820 may comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, computing devices installed in vehicles, vehicle installed user interfaces or user dashboards, multi-processor systems, microprocessor-based or programmable user electronics, game consoles, set-top boxes, network PCs, mini-computers, and the like.

Each of devices 810, 820 can include one or more components described in relation to computing device 800 shown in FIG. 8. Each of devices 810, 820 may connect to network 705 via a wired or wireless connection. Each of devices 810, 820 may include one or more applications such as, but not limited to, a web browser application, an application based on the enhanced research system described herein, and the like. In an example embodiment, the devices 810, 820 may perform all the functionalities described herein.

In other embodiments, the enhanced research system may be included on the device 810, 820, and the server 830 performs the functionalities described herein. In yet another embodiment, the device 810, 820 may perform some of the functionalities, and server 830 performs the other functionalities described herein.

Each of the database(s) 840 and server 830 is connected to the network 805 via a wired connection. Alternatively, one or more of the database(s) 840, and server 830 may be connected to the network 805 via a wireless connection. Although not shown, server 830 can be (directly) connected to the database(s) 840. Server 830 comprises one or more computers or processors configured to communicate with devices 810, 820 via network 805. Server 830 hosts one or more applications or websites accessed by devices 810, 820 and/or facilitates access to the content of database(s) 840. Database(s) 840 comprise one or more storage devices for storing data and/or instructions (or code) for use by server 830, and/or devices 810, 820. Database(s) 840, and/or server 830 may be located at one or more geographically distributed locations from each other or from devices 810, 820. Alternatively, database(s) 840 may be included within server 830.

FIG. 9 is a block diagram of an exemplary computing device 900 that may be used to implement exemplary embodiments of the enhanced research system 100 described herein. The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 906 included in the computing device 900 may store computer-readable and computer-executable instructions or software for implementing exemplary embodiments of the enhanced research system 100. The computing device 900 also includes configurable and/or programmable processor 902 and associated core 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or multiple core (904 and 904') processor.

Virtualization may be employed in the computing device 900 so that infrastructure and resources in the computing device may be shared dynamically. A virtual machine 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 918, such as a computer monitor, which may display one or more graphical user interfaces 922 that may be provided in accordance with exemplary embodiments. The computing device 900 may include other I/O devices for receiving input from a user, for example, a keyboard or any suitable multi-point touch interface 808, a pointing device 910 (e.g., a mouse), a microphone 928, and/or an optical scanning/capturing device 932 (e.g., a camera, scanner, barcode reader, QR code reader). The multi-point touch interface 908 (e.g., keyboard, pin pad, scanner, touch-screen, etc.) and the pointing device 910 (e.g., mouse, stylus pen, etc.) may be coupled to the visual display device 818. The computing device 900 may include other suitable conventional I/O peripherals. As described herein, the optical scanning device 932 can scan optical machine-readable representations associated with physical objects so that the computing device 900 can receive and process the identifier.

The computing device 900 may also include one or more storage devices 924, such as a hard-drive, CD-ROM, or other computer readable media, for storing data and computer-readable instructions and/or software that implement exemplary embodiments of the enhanced research system 100 described herein. Exemplary storage device 924 may also store one or more databases for storing any suitable information required to implement exemplary embodiments. For example, exemplary storage device 924 can store one or more databases 926 for storing information and data to be used by embodiments of the system 100. The databases may be updated manually or automatically at any suitable time to add, delete, and/or update one or more items in the databases.

The computing device 900 can include a network interface 912 configured to interface via one or more network devices 920 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 900 can include one or more antennas 930 to facilitate wireless communication (e.g., via the network interface) between the computing device 900 and a network. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. Moreover, the computing device 900 may be any computer system, such as a workstation, desktop computer, server, laptop, handheld computer, tablet computer (e.g., the iPad™ tablet computer), mobile computing or communication device (e.g., the iPhone™ communication device), internal corporate devices, or other form of computing or telecommunications device that is capable of communication and that has sufficient processor power and memory capacity to perform the operations described herein.

The computing device 900 may run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 916 may be run in native mode or emulated mode. In an exemplary embodiment, the operating system 916 may be run on one or more cloud machine instances.

User Interface

Figure 10A:
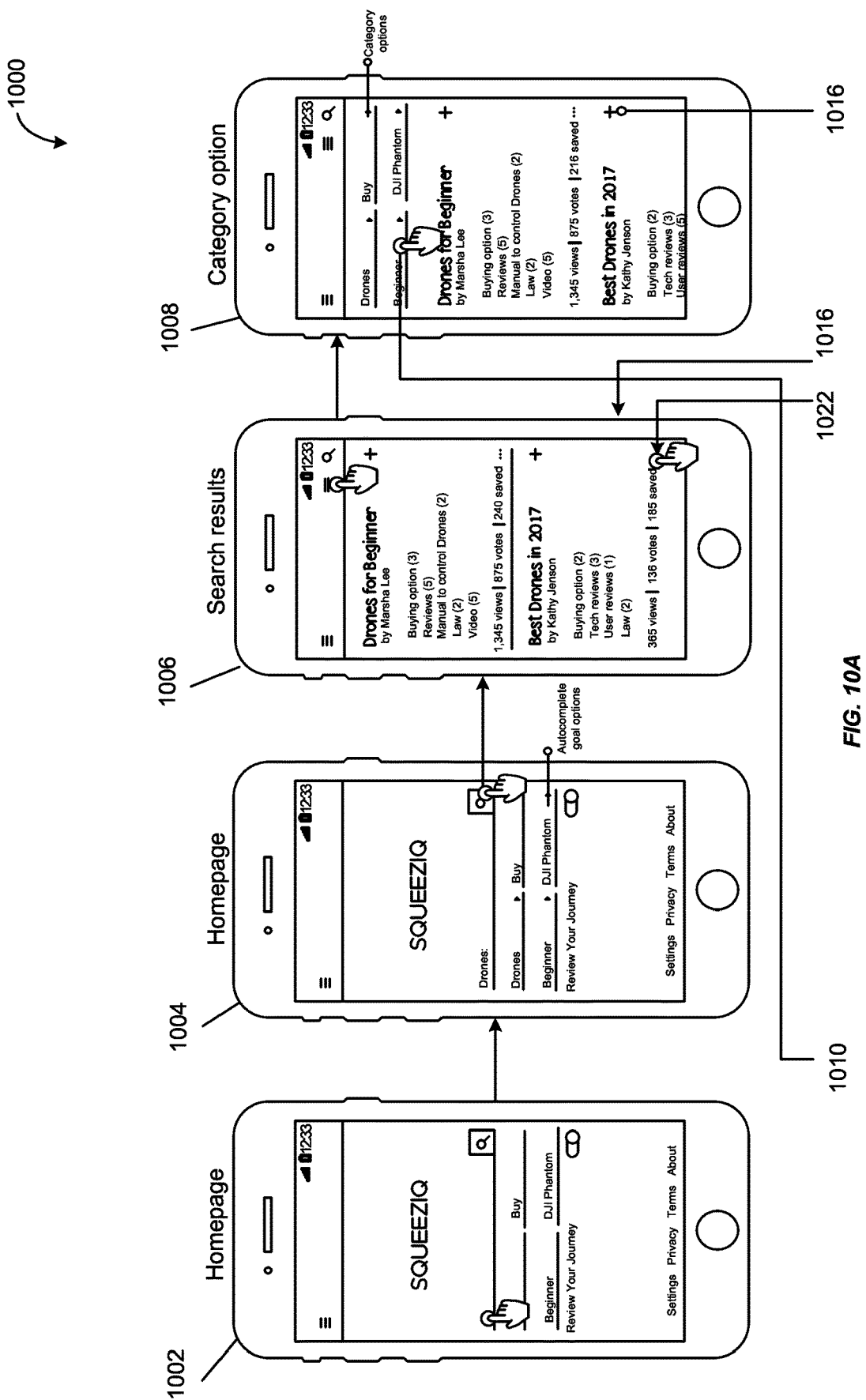
FIGS. 10A-10C is an exemplary workflow for the enhanced research system, according to an example embodiment.
Figure 10B:
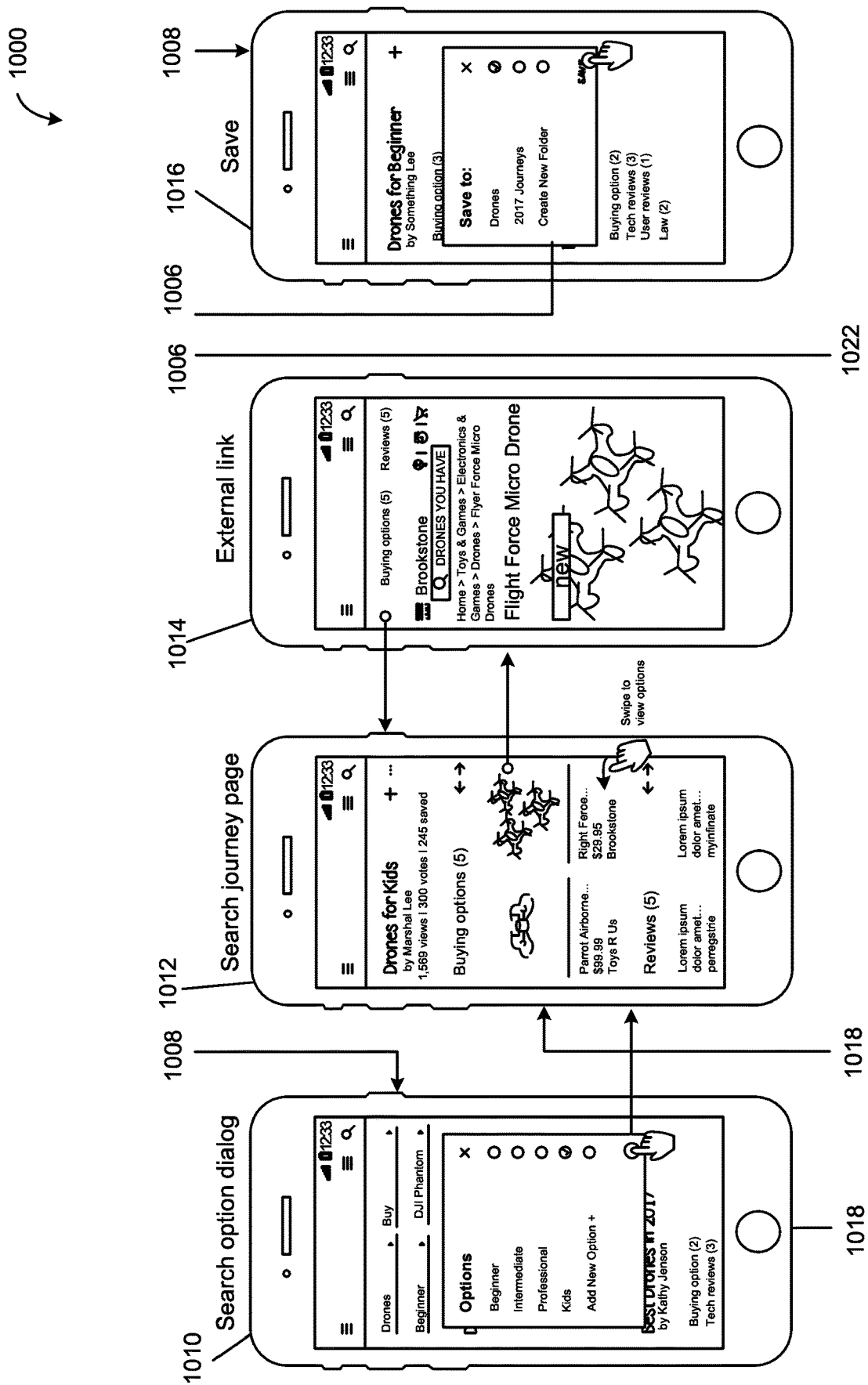
Figure 10C:
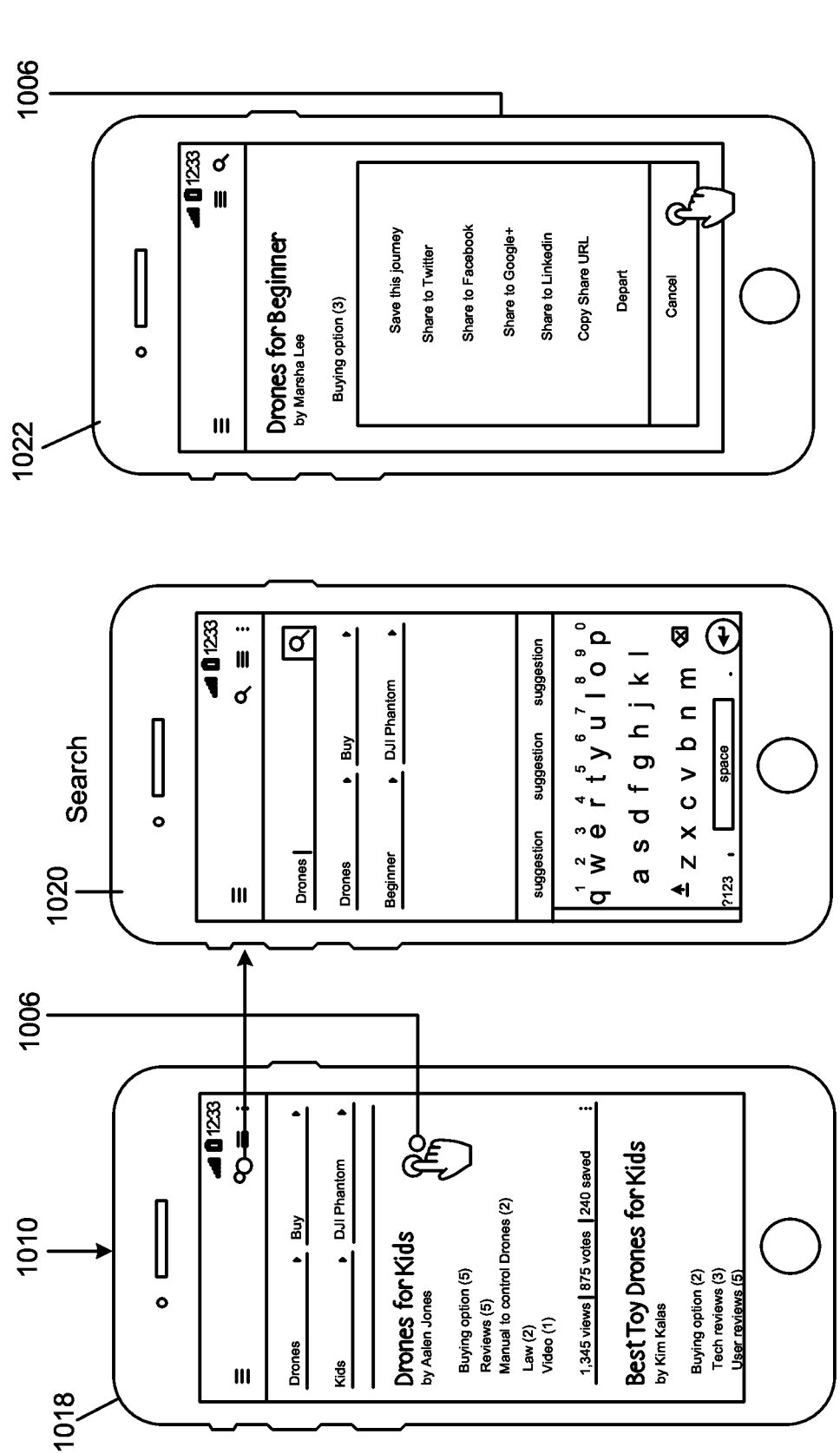

FIGS. 10A-10C illustrate an exemplary user workflow 1000 for when the enhanced research system is used on a mobile device, according to an example embodiment. In an example embodiment, the enhanced research system may be provided as an app called "Pikurate." The workflow 1000 begins at step 1002 where the homepage for the enhanced research system is displayed. The user enters search terms or keywords in the search dialog box, and clicks the search button. Upon clicking of the button, the workflow 1000 continues to step 1004 where the entered search terms or keywords are parsed and categorized. As described above, the enhanced research system determines the research goal and automatically assigns categories to each of the keywords or search terms. At step 1004, the enhanced research system displays the automatically categorized keywords. For example, "drone" is displayed as the target category and "buy" is displayed as the action category. In an example embodiment, the enhanced research system assigns "beginner" as the experience level category based on analysis of the user's past search history.

If the user is satisfied, he or she can click the search button, which continues the workflow to step 1006. At step 1006, the enhanced research system displays Pik results based on analysis and matching of the categorized keywords or search terms. The user can click on a category button, which moves the workflow to step 1008. At step 1008, the user can save search results of interest by clicking a save button. Clicking on the save button continues the workflow 1000 to step 1016 (FIG. 10B). At step 1016, the user can select or enter a folder name where the search results are saved. Once this information is entered, the workflow returns to step 1006 where the user can continue viewing the Pik results.

At step 1008, the user can also edit the automatically assigned categories. For example, the user can edit the experience level category by clicking on it at step 1008. At this point, the workflow continues to step 1010 (FIG. 10B). At step 1010, the user can enter a new keyword or select from an available list of keywords for the experience level category. For example, here the user selects "kids" instead of "beginner," and clicks on the search button. Clicking on the search button displays new Pik results at step 1018 (FIG. 10C) that match the updated categorized keywords.

The user can click on a Pik from the Pik results to display expanded information in the Pik (step 1012 of FIG. 10B). As described above, a Pik is an organized list of search results, links or content. The user can scroll through the Pik results using a swipe gesture at the mobile device interface. At step 1012, the user can click on the links within the Pik. Clicking on the links opens the link at step 1014 (FIG. 10B). The user can return to step 1012 to view the Pik by clicking on a button at step 1014.

At any time, the user can click on the search button to edit keywords or enter new keywords. For example, at step 1018 (FIG. 10C) the user can click on the search button (e.g., magnifying glass icon), and the workflow continues to step 1020 (FIG. 10C) where the user can edit the search terms.

At step 1022 (FIG. 10C), a user can view options for sharing a Pik. The options for sharing displayed on the screen include, for example, share to Twitter, share to Facebook, share to Google +, Share to LinkedIn, and copy URL to share. The options also include "Report," which a user can use to report a Pik if it includes inappropriate information.

FIGS. 11A-11F illustrate exemplary user interface screens for the enhanced research system, according to an example embodiment. In an example embodiment, the enhanced research system may be provided as a website called "Pikurate."

Figure 11A:
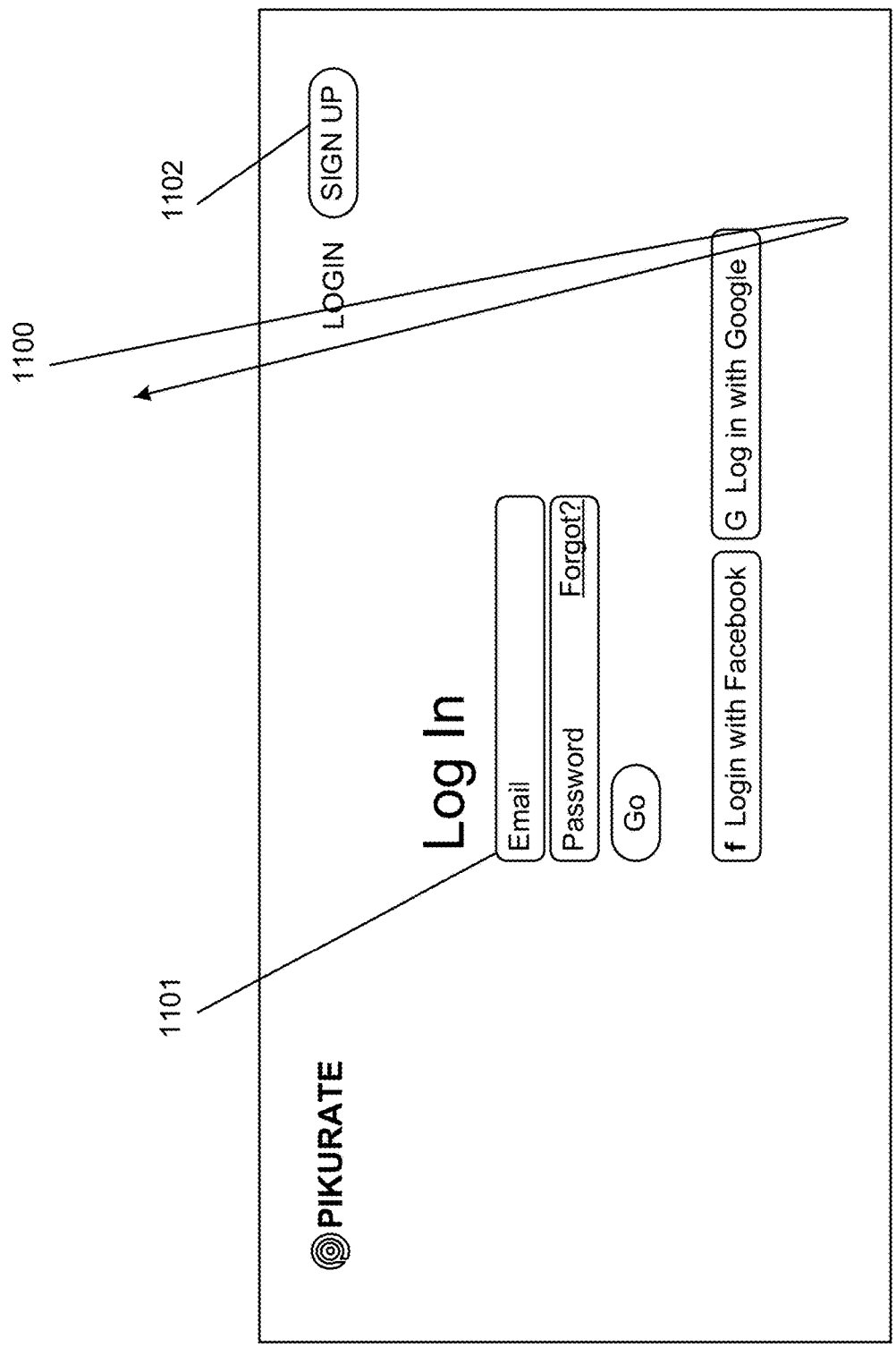

FIG. 11A illustrates an exemplary user interface screen 1100 that displays a login page. The user can login into his or her "Pikurate" account by entering account credentials in the login box 1101. If the user does not have an account with Pikurate, he or she can register an account by clicking the "Sign Up" button 1102.

Figure 11B:
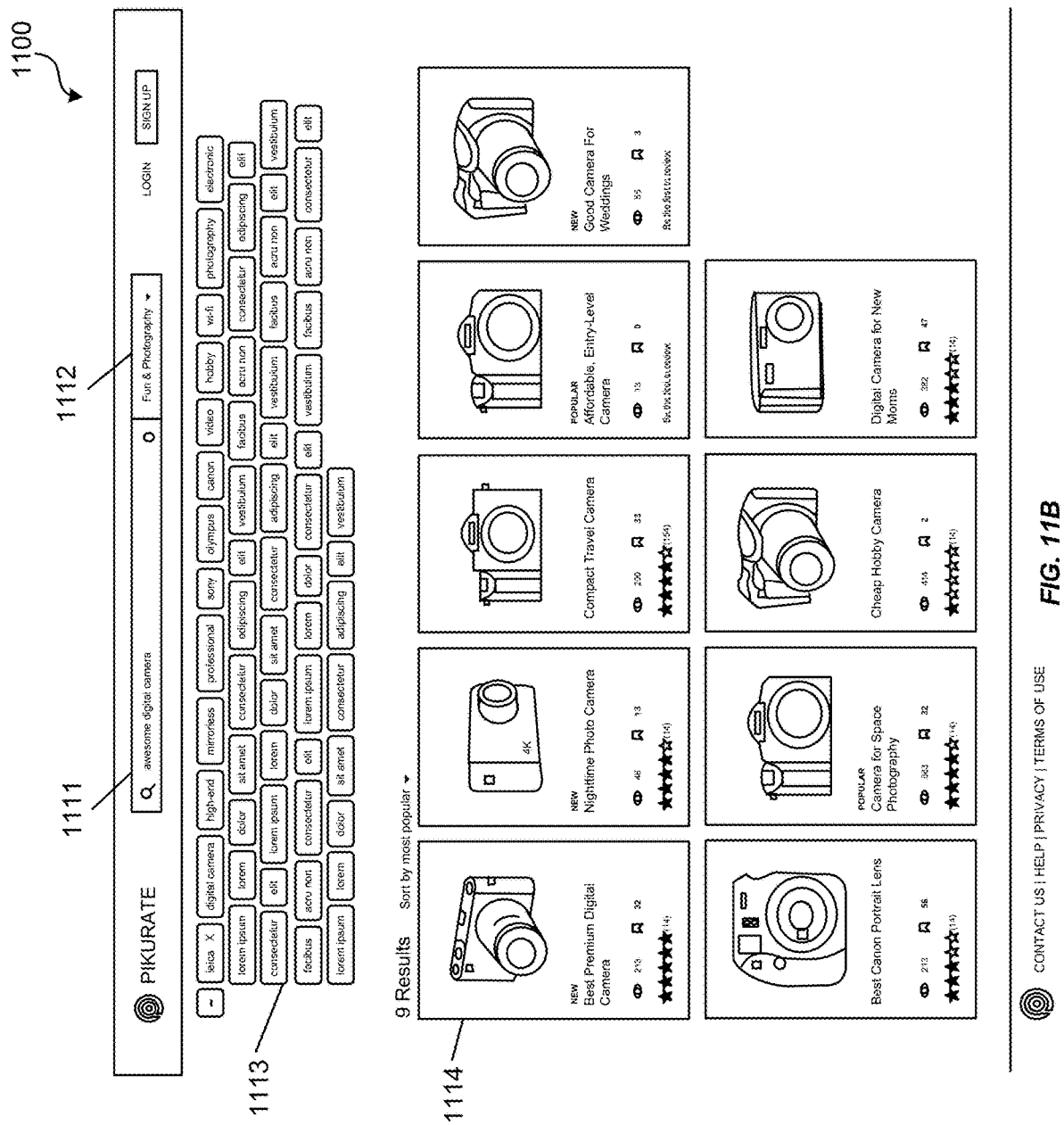

FIG. 11B illustrates an exemplary user interface screen 1110 where the user can enter search terms or keywords in a search box 1111. The user can select specific category under a category menu 1112. For example, the user can enter "awesome digital camera" in the search box 1111 and select "Fun & Photography" from the category menu 1112. Based on the entered search terms and selected category, the system can provide a number of tags 1113 to the user. The user can choose tags that are appealing to him or her. The system can then narrow down the results and display them in the result section 1114.

Figure 11C:
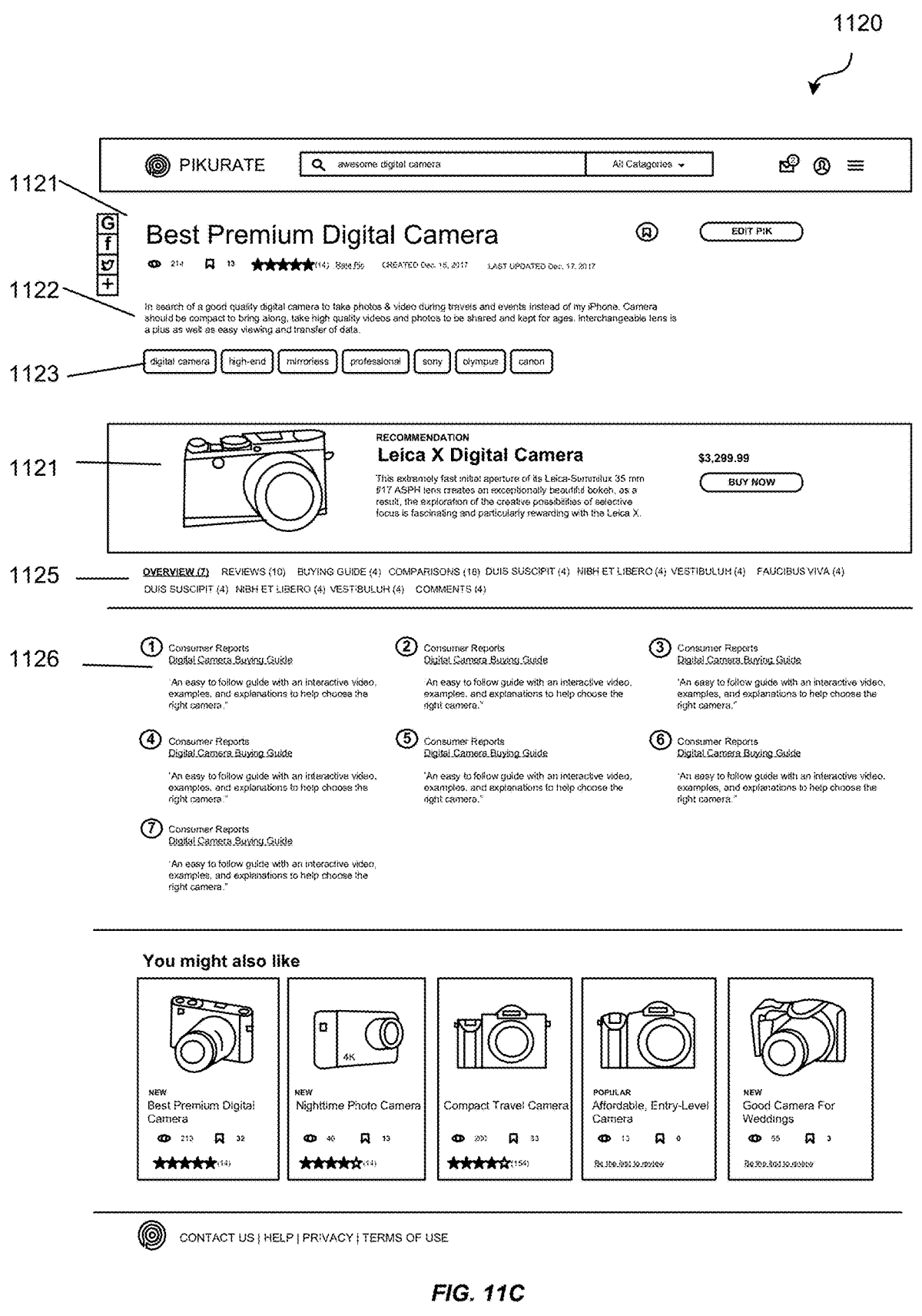

FIG. 11C illustrates an exemplary user interface screen 1120 that displays more information for a Pik selected by the user by clicking on one of the Piks displayed in user interface screen 1110. In some embodiments, the Pik can include a title 1121, a brief description 1122, one or more tags 1123. In some embodiments, if the Pik is related to a product research, the system can provide the user with a recommended product 1124. In some embodiments, the Pik can include one or more sections or sub-titles 1125. Under each section or subtitle, there can be a number of website links and comments on the links 1126.

Figure 11D:
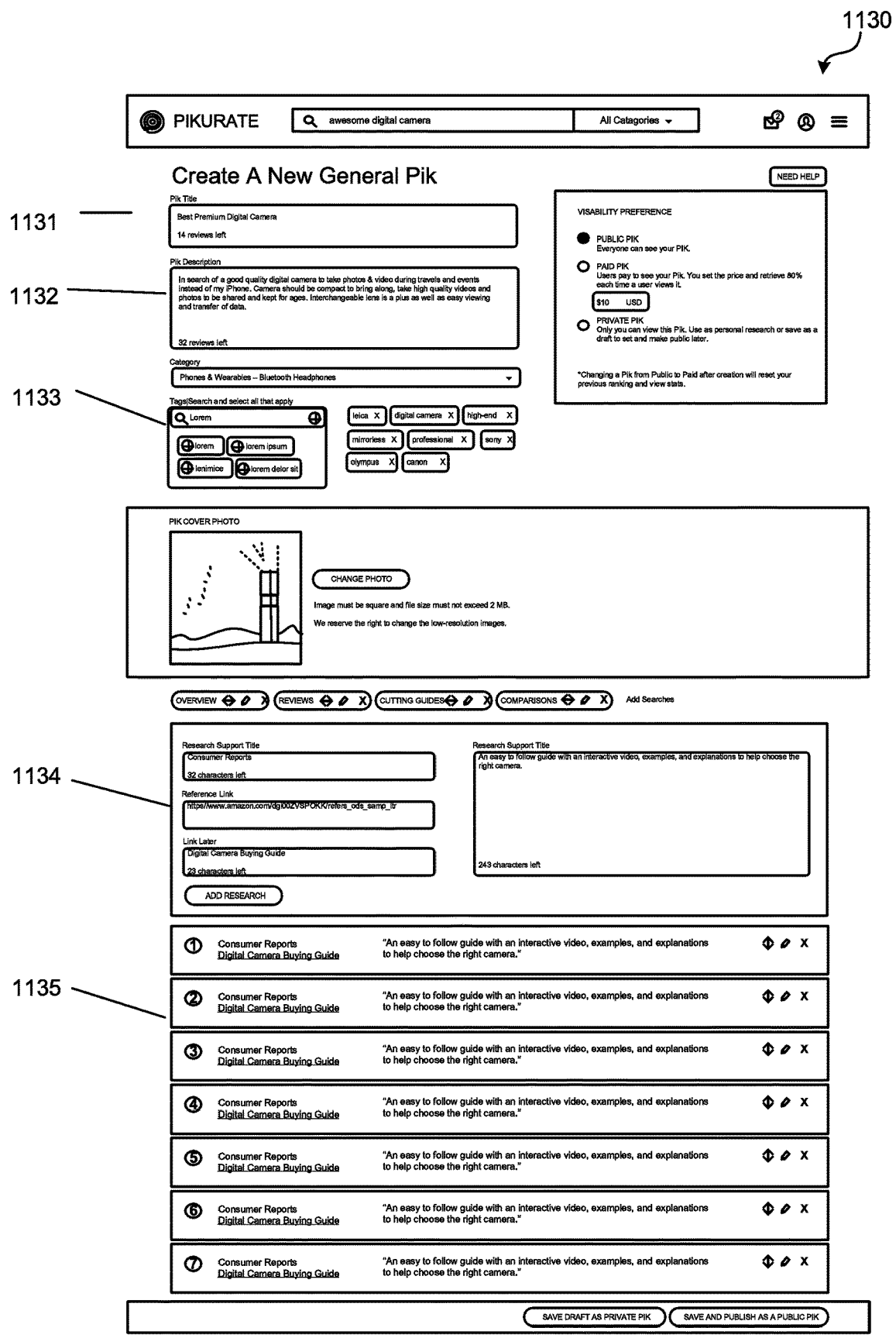

FIG. 11D illustrates an exemplary user interface screen 1130 for creating a Pik on the "Pikurate" website. A user can enter a title of the Pik 1131, a brief description 1132, one or more tags 1133. The user can enter one or more website links and comments 1134. The saved links can be shown in the list 1135. In some embodiments, the system can provide suggestions to a user. For example, when a user creates a title for a research goal, the system can suggest sections to consider. In some embodiments, when a user refers to or edits a Pik, the system can suggest new links to add into one or more sections of the Pik.

Figure 11E:
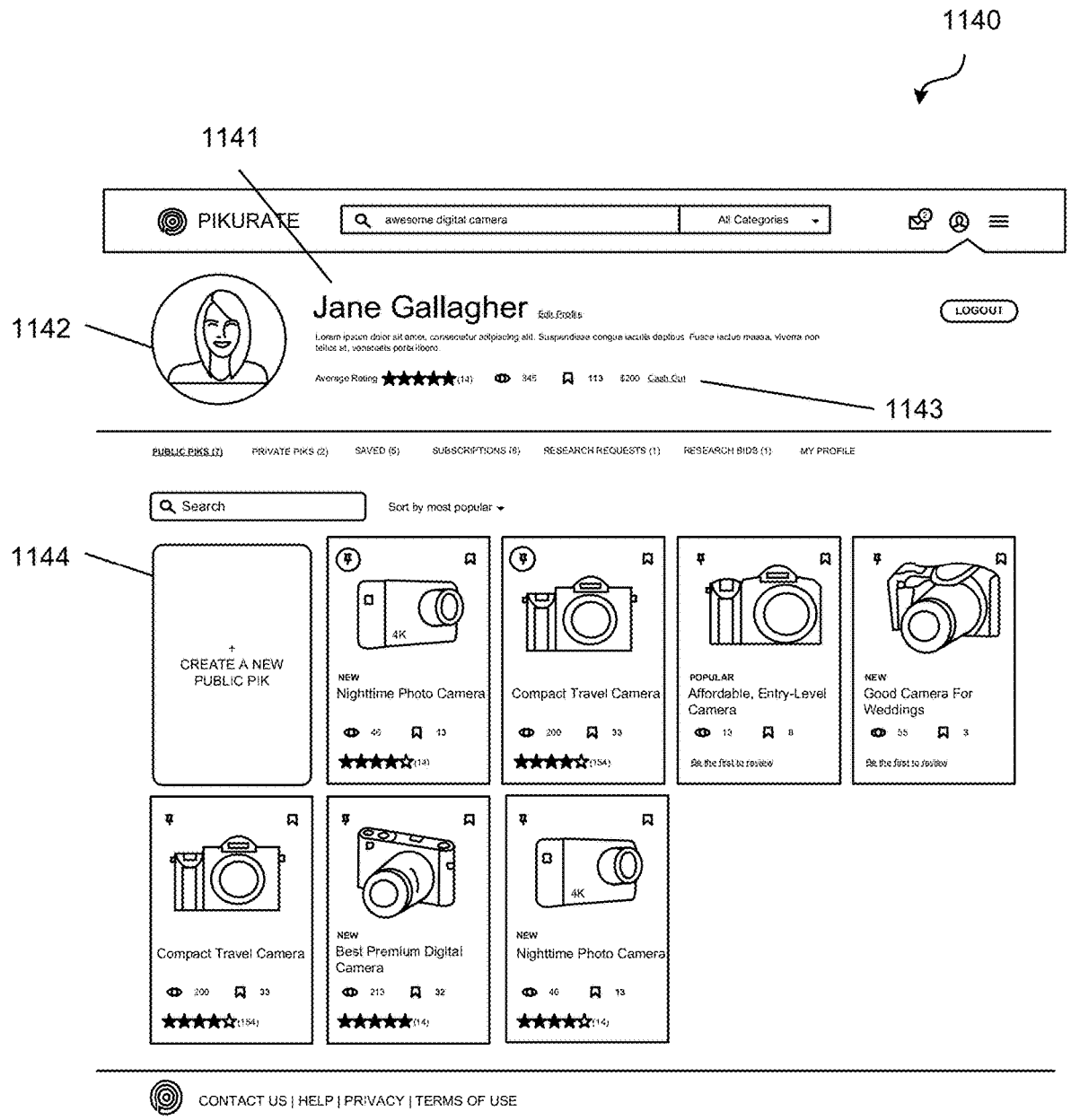

FIG. 11E illustrates an exemplary user interface screen 1140 for showing a user's profile page. The profile page can include the user's name 1141, the user's profile photo 1142 and activity data 1143 including rating, number of views, number of shares, etc. The profile page can also include a list of Piks 1144 the user has created or viewed. The profile page can also include categories for Piks, such as public, private, saved, subscriptions, research requests, research bids, etc.

Figure 11F:

FIG. 11F illustrates an exemplary user interface screen 1150 for showing a list of creators. The system can provide a creator list 1151 to a user based on one or more search terms entered by the user. The creators can be ranked by one or more metrics, such as rating, number of created Piks, number of views, number of shares, etc.

Figure 12A:
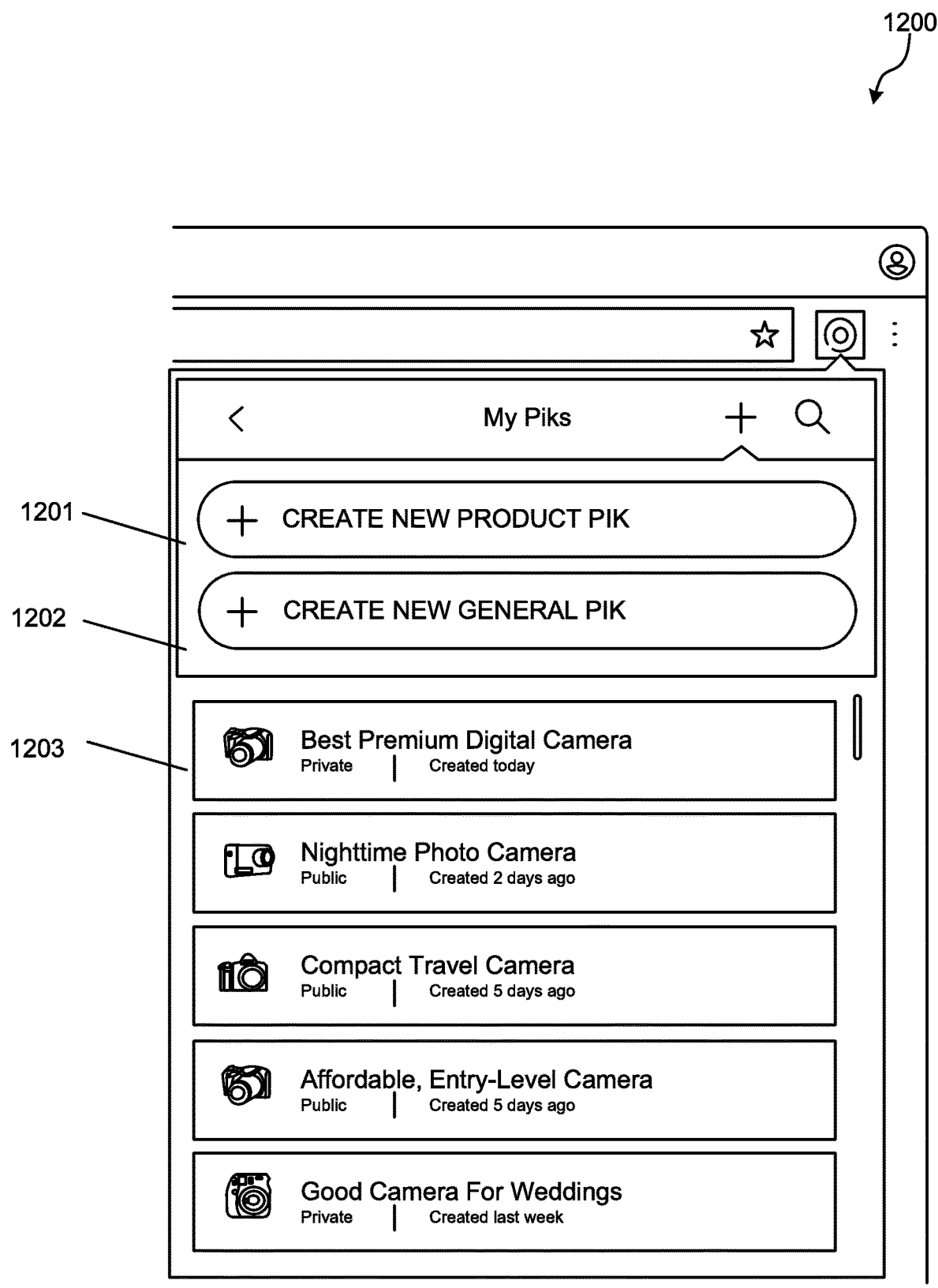
FIGS. 12A-12D illustrate exemplary user interfaces for the enhanced research system being used as a Google Chrome Extension, according to an example embodiment.

FIGS. 12A-12D illustrate exemplary user interface screens for the enhanced research system being used as a Google Chrome Extension, according to an example embodiment. In these examples, the enhanced research system may be provided as a website called "Pikurate." FIG. 12A illustrates an exemplary user interface screen 1200 where a Pikurate Chrome Extension icon is displayed on the screen to enable the user to access features of the enhanced research system. A user can choose to create a new product Pik by clicking the button 1201 and enter a title of the Pik. The user can also create a new general Pik by clicking the button 1202 and enter a title. A list of Piks created by the user can be shown in the section 1203.

Figure 12B:
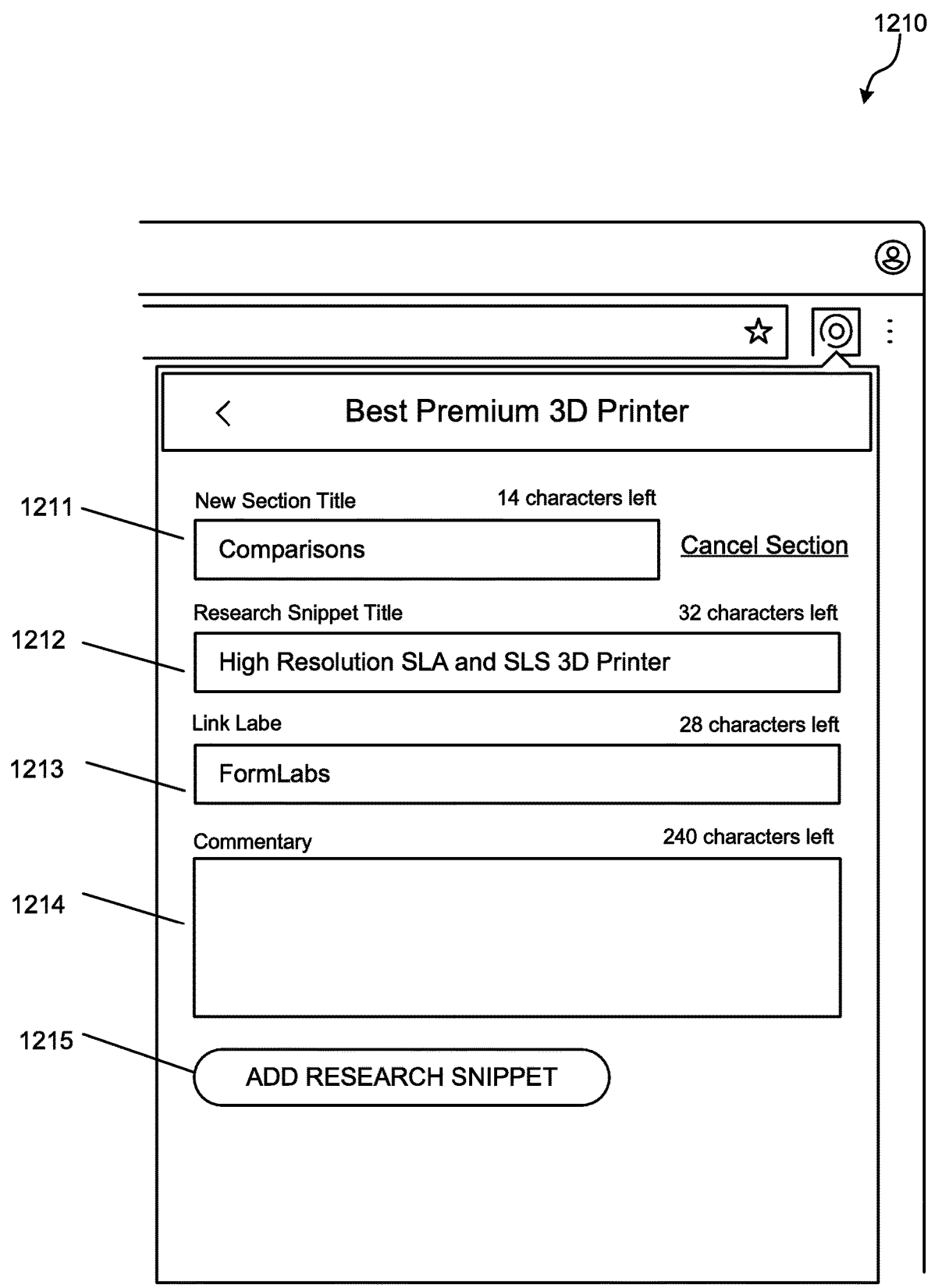

FIG. 12B illustrates an exemplary user interface screen 1210 for adding a new section. The user can enter a title of the new section in the box 1211. The user can enter a title of the research snippet in the box 1212. The user can add link label in the box 1213. The user can also add comments in the box 1214. The user can also save the new research snippet by clicking the button 1215 to screenshot the specific area of the website to store for viewing in the future.

Figure 12C:
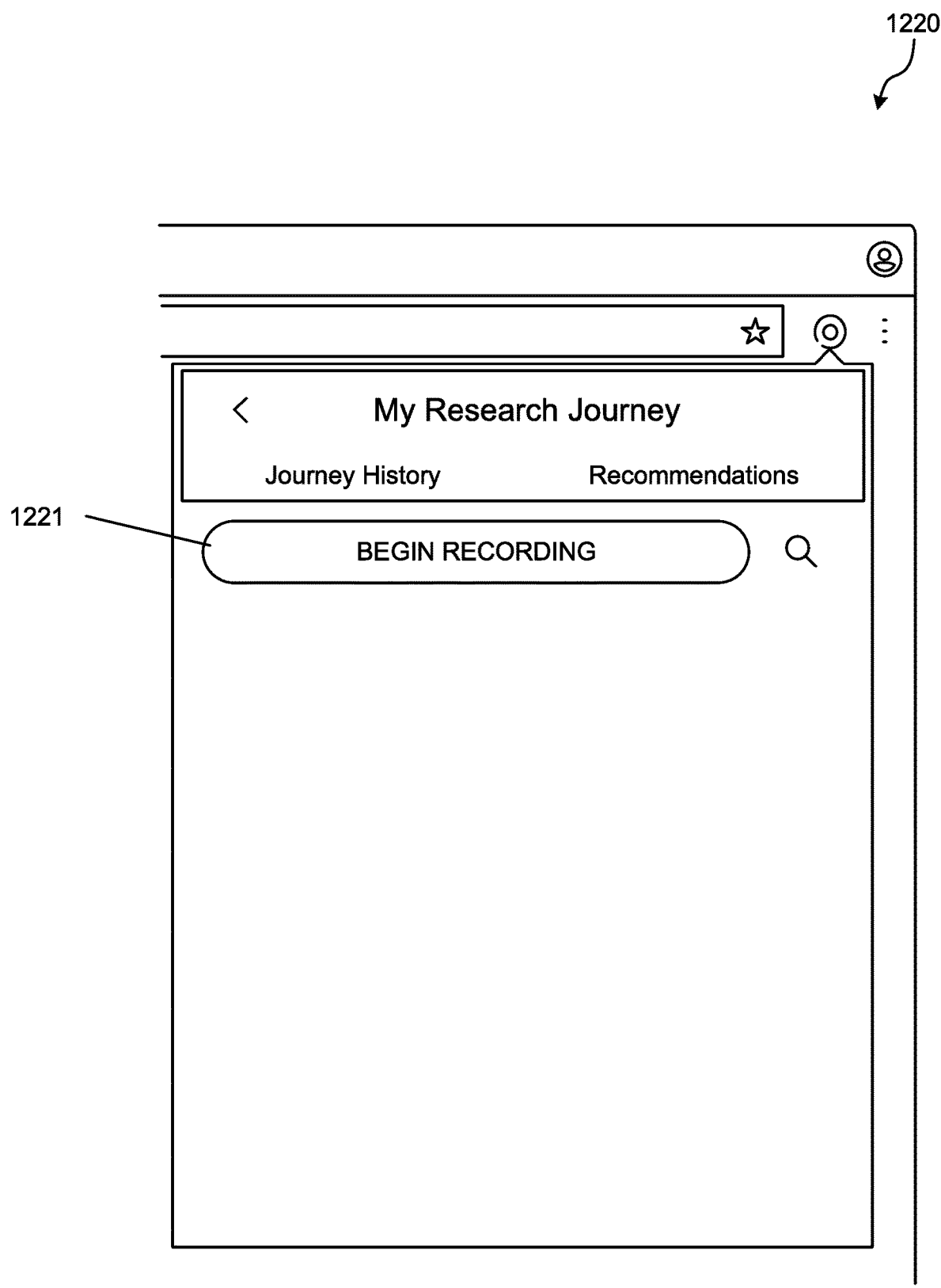

FIG. 12C illustrates an exemplary user interface screen 1220 for recording a user's browsing history. When the user clicking the "Begin Recording" button 1221, the browser extension can start recording the user's browsing history.

Figure 12D:
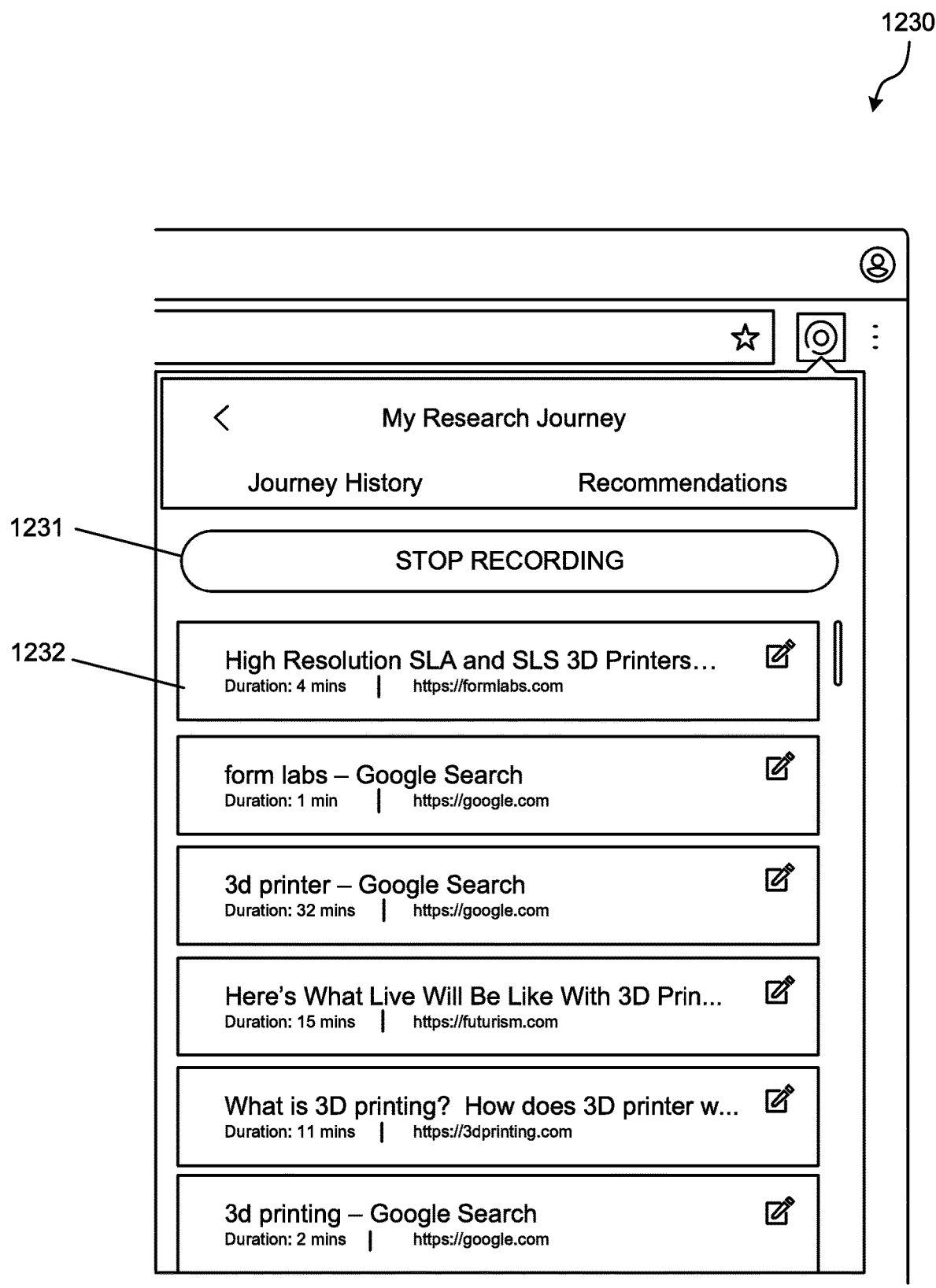

FIG. 12D illustrates an exemplary user interface screen 1230 for recording a user's browsing history. When the browser extension is recording the user's browsing history, information of all the recorded websites can be shown in the list 1232. The information can include a title of the website, a link of the website, time duration of visiting, etc. The user can click the "Stop Recording" button 1231 to stop the recording and save the results to his or her account. In some embodiments, the user can manually remove unwanted website from the list 1232. In some embodiments, the system can use an algorithm to automatically remove unwanted website from the list 1232. In some embodiments, the user can also manually add the link (and its relevant information) during the research process via a button or hotkey.

In an example embodiment, the search history, created and saved Piks, and other data is stored at the user's device (e.g., device 810, 820), instead of being stored at a server (e.g., server 830). In this embodiment, blockchain technology may be used to store data at the user's device, and this allows for a higher level of protection and privacy of the user's personal search history data. In some embodiments, once the user publishes a Pik, all relevant data can be saved at a server (e.g., server 830.)

As an example use, the enhanced research system described herein can be used to create Piks that may be used by corporations to train to employees or personnel. Use of Piks may reduce the learning curve and time for new employees or for new work procedures, since an employee can use a Pik to learn a new skill rather than receiving training from another personnel. Pik can capture the pattern of consumption of the documents to accomplish the tasks and reduce employees' research time.

In some embodiments, creators of Piks can be reviewed by other users and ranked based on the quality of their Piks and/or other attributes. In one embodiment, a creator with high ranking can be designated as a "trusted creator." In another embodiment, Piks created by a "trusted creator" can be listed in the front page of the search results to be shown to a user.

Marketplace

Figure 13:
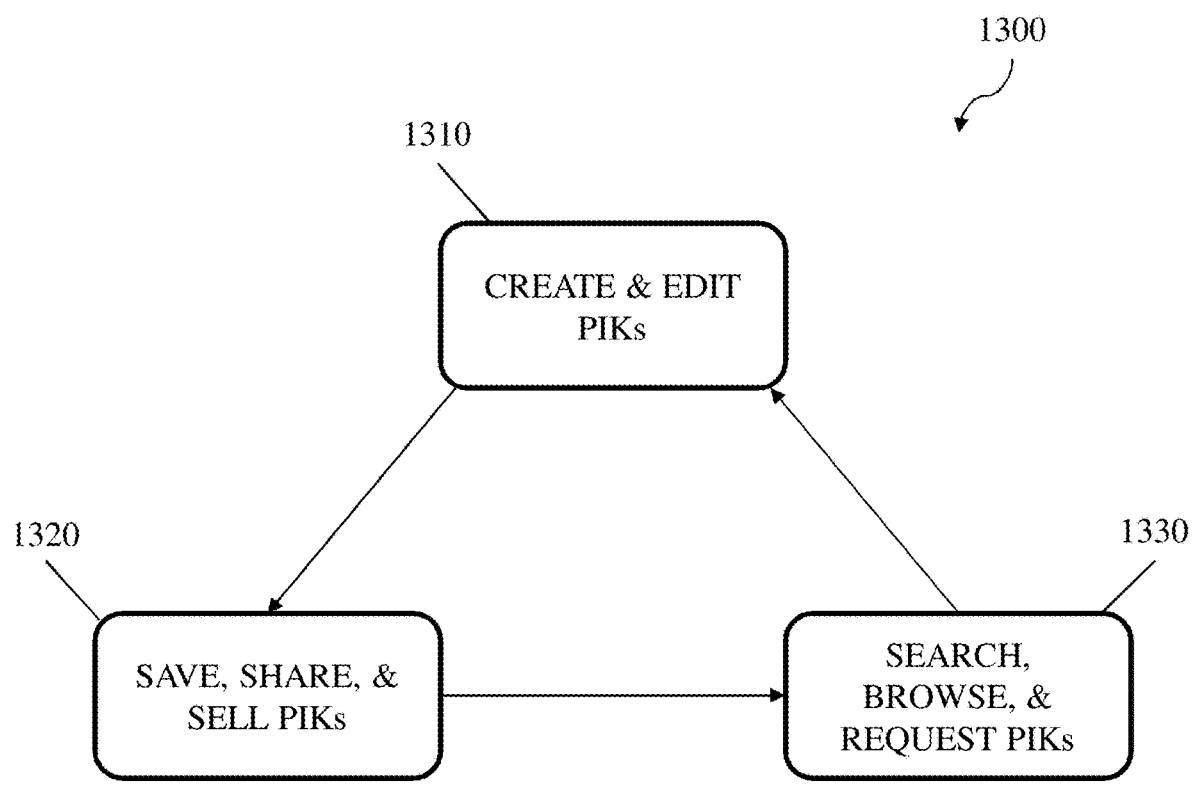
FIG. 13 is a block diagram showing functions of a marketplace for Piks, according to some embodiments of the present disclosure.

FIG. 13 is a block diagram showing a marketplace 1300 for Piks, according to some embodiments of the present disclosure. The marketplace herein refers to the requesting, bidding, selling, and buying paid Piks. In some embodiments, marketplace 1300 can include a creation and editing part 1310, a sharing and selling part 1320, and a searching and requesting part 1330. In the creation and editing part 1310, a user (or "creator") can conduct as online research and create a Pik with the systems and methods described in the present disclosure.

Referring to the sharing and selling part 1320, once the user has created their curated online research, he/she can save it onto their account for a variety of uses, ranging from public, private, paid, and drafts. The saved research can be accessed for future reference and updated. It can also be shared to specific users, to the Pikurate community, to others via social media, text, and email. In addition, the user has the opportunity to lock their research which can only be viewed when the requester pays the amount asked. In some embodiments, the sharing of Pik can include a collaborative or social research. For example, a user (knowledgeable or not) can start a Pik and have it open to the public to add sections and links. In some embodiments, a user can invite people (friends, family, etc.) to collaborate on a Pik. For example, a user may plan for a group trip and start a Pik of travel research. The user can invite other people who would travel with him or her to collaborate on the Pik.

Referring to the searching and requesting part 1330, a user can share or post his or her request for Pik in the marketplace. The request can specify the user's detailed research needs such as target, action, etc. Other users or creators of Piks can view and bid for the request. In one embodiment, the user requesting a Pik can compensate another user who provides the Pik through regular payment channels (e.g., credit cards, bank accounts, third party online payment systems, etc.) In another embodiment, users can purchase internal system credits or points to be used for payment of Piks.

In some embodiments, public and paid research can be searched for with keywords, as well as sorting and filtering options. The recommended results may vary depend on factors from the algorithm that can consist of demographic and behavioural data, content and tag analysis, and real-time big data. Furthermore, the user will be able to browse various curated online research from the homepage and their subscriptions to other users. If the desired research cannot be found, then the user has the opportunity to place a request for it. Other users can now bid on the opportunity to conduct the research and the requester can make the final decision on which creator to move forward with.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A computer-implemented method for providing an enhanced research platform, the method comprising:
    receiving, by a computer processor over a network, one or more keywords, the one or more keywords having been generated based on characters input on a computing device associated with a user;
    receiving, by the computer processor over the network, one or more tags, the one or more tags having been selected on the computing device;
    determining, by the computer processor, an experience level of the user by analyzing past search history of the user and activity of the user;
    identifying, by the computer processor, a plurality of curated online research archives stored in a database that match the one or more keywords and the one or more tags, wherein each of the plurality of curated online research archives is associated with a research topic and comprises a list of websites ordered to indicate a progression in research from a broad concept to a narrow concept, the websites having been added to the curated online research archive by one or more other users as being relevant to the research topic associated with the curated online research archive;
    ranking, by the computer processor, each of the plurality of curated online research archives based on a relevancy of the curated online research archive to the one or more keywords, the one or more tags, and the experience level of the user;
    providing, by the computer processor, the ranked plurality of curated online research archives for display in a user interface on the computing device;
    receiving, by the computer processor, an indication of a selection of one of the ranked plurality of curated online research archives; and
    providing, by the computer processor, the ordered list of websites of the selected curated online research archive for display in the user interface on the computing device.

2. The method of claim 1, further comprising ranking the identified plurality of curated online research archives based on an attribute of one of the plurality of curated online research archives, wherein the attribute comprises at least one of real time trends and popularity, number of links, number of views, or rating.

3. The method of claim 1, further comprising ranking the identified plurality of curated online research archives based on an attribute of a creator associated with one of the plurality of curated online research archives, wherein the attribute comprises at least one of: number of subscribers of the creator, number of curated online research archives created by the creator, or rating of the creator.

4. The method of claim 1, further comprising ranking the identified plurality of curated online research archives based on an attribute of a web site link associated with one of the plurality of curated online research archives, wherein the attribute comprises at least one of: duration of visit of the website link, number of characters on a webpage associated with the website link, or number of revisits associated with the website link.

5. The method of claim 1, wherein each of the websites is categorized with one or more keywords, and each of the plurality of curated online research archives further comprises one or more tags, user demographic data, and user behavioral data, further comprising:
    receiving user demographic and behavioral data; and
    identifying the plurality of curated online research archives based on a matching of the received one or more keywords, the received one or more tags, the received demographic data, and the received behavioral data to the one or more keywords, the one or more tags, the user demographic data, and the user behavioral data associated with the plurality of curated online research archives.

6. The method of claim 5, further comprising: ranking the plurality of curated online research archives based on a relevancy of the received one or more keywords, the received one or more tags, the received demographic data, and the received behavioral data to the one or more keywords, the one or more tags, the user demographic data, and the user behavioral data associated with the plurality of curated online research archives.

7. The method of claim 5, wherein the received user demographic data comprises at least one of a location, gender, age, education level, or household income of a user, and the user demographic data associated with a curated online research archive comprises at least one of a location, gender, age, experience level, education level, or household income of a creator of the curated online research archive.

8. The method of claim 1, wherein each of the plurality of curated online research archives comprises a title that indicates the research topic, an order of one or more sub-titles that indicate categories for grouping like websites, and an order of websites within each sub-title to indicate progression from an end-to-end research.

9. A computer-implemented method for creating a curated online research archive, wherein the curated online research archive comprises a list of websites, the method comprising:
    receiving, by a computer processor, a title based on input from a user;
    receiving, by the computer processor, one or more tags based on input from the user;
    receiving, by the computer processor, one or more section names based on input from the user;
    receiving, by the computer processor, an indication that the user has made a selection to start recording a search history of a web browser;
    recording, by the computer processor, a list of websites visited by the web browser based on the received indication using a web browser extension for the web browser;
    receiving, by the computer processor, an indication that the user has made a selection to stop recording the search history of the web browser;
    filtering, by the computer processor, the recorded list of websites using the web browser extension, wherein filtering comprises removing parent webpages from the recorded list of websites;

categorizing, by the computer processor, the filtered list of websites based on the one or more section names using the web browser extension;

receiving, by the computer processor, a display order based on input from the user;

receiving, by the computer processor, a comment associated with a website in the filtered list of websites based on input from the user;

creating, by the computer processor, a curated online research archive, wherein the curated online research archive comprises the title, the one or more tags, the comment, and the categorized list of websites, wherein the categorized list of websites is displayed in the display order specified by the user; and outputting, by the computer processor, the curated online research archive.

10. The method of claim 9, further comprising filtering the recorded list of websites based on an amount of time the user spent on each of the websites in the list.

11. The method of claim 9, wherein filtering the recorded list of websites comprises:

providing the recorded list of websites for display to the user;

receiving from the user a selection of one or more websites; and removing the one or more websites from the recorded list of websites based on the received selection.

12. The method of claim 9, wherein filtering the recorded list of websites comprises: filtering the recorded list of websites based on a set of pre-defined rules.

13. The method of claim 9, comprising:

receiving user demographic data; and updating the curated online research archive by adding the received user demographic data to the curated online research archive.

14. The method of claim 13, wherein the user demographic data comprises at least one of a location, gender, age, education level, or household income of the user.

15. The method of claim 9, comprising:

receiving an instruction of editing from the user; and updating the categorized list of websites in response to the instruction of editing.

16. A system for providing an enhanced research platform, the system comprising:

a computer processor; and a non-transitory computer readable storage medium storing computer program instructions which, when executed by the computer processor, cause the computer processor to perform a method, the method comprising:

receiving, over a network, keywords, the keywords having been generated based on characters input on a computing device associated with a user;

parsing the keywords to identify an action, a target, and a purpose;

determining a research goal based on the identified action, target, and purpose;

determining, by the computer processor, an experience level of the user by analyzing past search history of the user and activity of the user;

identifying a plurality of curated online research archives that match the determined research goal, wherein each of the plurality of curated online research archives is associated with a research topic and comprises user demographic data and a list of websites, the websites having been added to the curated online research archive by one or more other users as being relevant to the research topic associated with the curated online research archive, wherein each of the websites is categorized with one or more keywords, and each of the plurality of curated online research archives further comprises user demographic data;

ranking each of the plurality of curated online research archives based on a relevancy of the curated online research archive to the determined research goal and the experience level of the user;

providing the ranked plurality of curated online research archives for display in a user interface on the computing device;

receiving an indication of a selection of one of the ranked plurality of curated online research archives; and providing the ordered list of websites of the selected curated online research archive for display in the user interface on the computing device;

wherein the computer processor is further configured to receive user demographic data; and identify the plurality of curated online research archives based on a matching of the received one or more keywords, and the received demographic data to the one or more keywords, and the user demographic data associated with the plurality of curated online research archives;

wherein the computer processor is further configured to rank the plurality of curated online research archives based on a relevancy of the received one or more keywords, and the received demographic data to the one or more keywords, or the user demographic data associated with the plurality of curated online research archives.

17. The system of claim 16, wherein the received user demographic data comprises at least one of a location, gender, age, education level, or household income of a user, and the user demographic data associated with a curated online research archive comprises at least one of a location, gender, age, experience level, education level, or household income of a creator of the curated online research archive.

18. The system of claim 16, wherein each of the plurality of curated online research archives comprises a title that indicates the research topic, an order of one or more sub-titles that indicate categories for grouping like websites, and an order of websites within each sub-title to indicate progression from an end-to-end research.

* * * * *